(12) United States Patent
Saito

(10) Patent No.: US 7,295,383 B2
(45) Date of Patent: Nov. 13, 2007

(54) IMAGING LENS

(75) Inventor: Tomohiro Saito, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 11/580,422

(22) Filed: Oct. 12, 2006

(65) Prior Publication Data

US 2007/0091470 A1    Apr. 26, 2007

(30) Foreign Application Priority Data

Oct. 20, 2005    (JP) .............................. 2005-305650

(51) Int. Cl.
*G02B 13/18* (2006.01)
*G02B 9/00* (2006.01)

(52) U.S. Cl. ...................... 359/716; 359/739
(58) Field of Classification Search ........ 359/715–717, 359/739–741, 754–757, 759, 771, 776, 661, 359/660, 784, 792

See application file for complete search history.

(56) References Cited

U.S. PATENT DOCUMENTS 6,222,682 B1 *    4/2001   Saito et al. ................ 359/717
6,560,043 B1 *    5/2003   Saito et al. ................ 359/785

FOREIGN PATENT DOCUMENTS

| JP | 2003-322792 | 11/2003 |
|----|-------------|---------|
| JP | 2004-163786 | 6/2004  |
| JP | 2005-91513  | 4/2005  |
| JP | 2005-173298 | 6/2005  |

\* cited by examiner

*Primary Examiner*—Scott J. Sugarman
*Assistant Examiner*—M. Hasan
(74) *Attorney, Agent, or Firm*—Koda & Androlia

(57) ABSTRACT

It is to provide an imaging lens that maintains optical performance and achieves reduction in size and weight. The imaging lens comprises, in order from an object side towards an image surface side, a first lens which is a meniscus lens having a positive power whose convex surface faces the object side, a diaphragm, a second lens which is a meniscus lens having a positive power whose convex surface faces the image surface side, and a third lens which is a biconcave lens having a negative power, wherein the following conditions are to be satisfied; $1.3 \geq L/fl \geq 1$, $0.8 \geq f_1/fl \geq 0.6$, $0.12 \geq f_1/f_2 > 0$, $-0.1 \geq f_1/f_3 \geq -0.25$ (where, L: entire length of the lens system [distance from the surface of the object side of the first lens to the image taking surface [air reduced length]], fl: focal distance of the entire lens system, $f_1$: focal distance of the first lens, $f_2$: focal distance of the second lens, and $f_3$: focal distance of the third lens).

6 Claims, 21 Drawing Sheets

1: 656.27nm
2: 587.56nm
3: 486.13nm
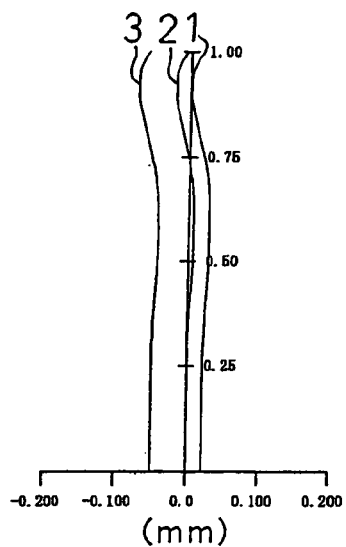
SPHERICAL ABERRATION
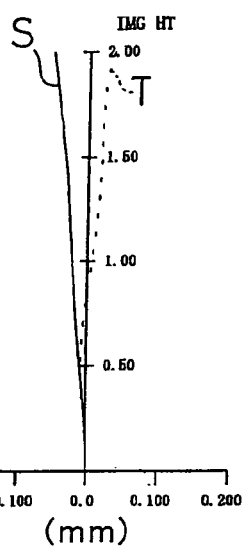
ASTIGMATISM
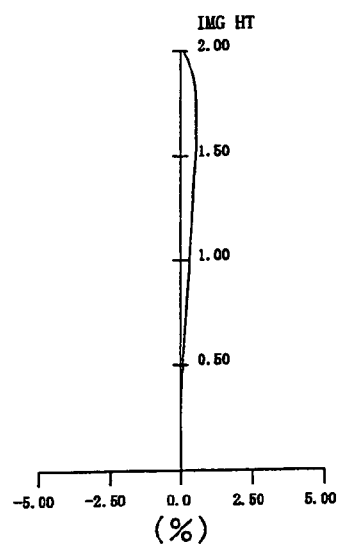
DISTORTION
FIG. 13

IMAGING LENS

BACKGROUND OF THE INVENTION

1. Field of the Invention

The present invention relates to an imaging lens and, particularly, to an imaging system of three-lens structure, which is capable of reducing the size and weight. The imaging system is used for an image-taking device that uses an image sensor element such as a CCD, CMOS, etc.

2. Description of the Related Art

Recently, there has been an increasing demand for cameras that utilize an image sensor element such as a CCD, CMOS, or the like, which are mounted on a portable computer, a television phone, a portable phone, and a digital camera, for example. It is demanded that a camera such as this is small and light because the camera is required to be mounted on a limited installation space.

Therefore, it is also necessary for the imaging lens system used for such cameras to be small and light, as is the camera. Conventionally, a single lens structure lens system using a single lens and a two-lens structure system that uses two lenses are used as such imaging lens systems.

These imaging lens systems are very advantageous for reducing the size and weight of the lens system. However, these imaging lens systems cannot handle higher definition and higher resolution that is demanded of the imaging lens system in recent years.

Therefore, conventionally, a three-lens lens system using three lenses is utilized to handle higher definition and higher resolution.

As the lens system with three-lens structure aiming for higher definition and higher resolution, there have been known the lens systems disclosed in Patent Literatures 1–4.

[Patent Literature 1] Japanese Patent Unexamined Publication 2005-173298

[Patent Literature 2] Japanese Patent Unexamined Publication 2005-91513

[Patent Literature 3] Japanese Patent Unexamined Publication 2003-322792

[Patent Literature 4] Japanese Patent Unexamined Publication 2004-163786

However, in the lens system in Patent Literature 1, a third lens is a negative lens whose convex surface faces the object side. Therefore, it is difficult to balance between aberration correction and size reduction of the lens system. In addition, the power distribution of first to third lenses and the center radius curvature of both surfaces of the first lens in the lens system in Patent Literature 1 cause the back focus distance to become too long. As a result, the entire length of the lens system becomes too long.

In addition, as in the lens system in Patent Literature 1, the power distribution of the first to third lenses in the lens system in Patent Literature 2 causes the back focus distance to become too long. As a result, the entire length of the lens system becomes too long.

Further, in the lens system in Patent Literature 3, the third lens is a negative lens whose convex surface faces the object side. Therefore, as in the lens system in Patent Literature 1, it is difficult to balance between aberration correction and reducing the size of the lens system. In addition, the power distribution of the first to third lenses in the lens system in Patent Literature 3 causes the overall length of the lens system to become too long. In addition, in the lens system in Patent Literature 3, the back focus distance is short and the third lens has a meniscus shape. Therefore, the last surface in the end of the optical surface protrudes significantly towards the image surface side, thereby causing a problem when various filters and the like are inserted.

Still further, the power distribution of the first, second, and third lenses in the lens system in Patent Literature 4 causes the entire length of the lens system to become too long.

Therefore, the conventional lens systems are still insufficient for maintaining an excellent optical performance, such as high-definition and high-resolution, while actualizing a further reduction in the size and weight (shortening of the entire length) of the lens system itself.

The present invention has been designed in view of the aforementioned problems. The object of the present invention, therefore, is to provide an imaging lens that can maintain an excellent optical performance, while actualizing a further reduction in the size and weight.

SUMMARY OF THE INVENTION

In order to achieve the aforementioned object, the imaging lens according to a first aspect of the present invention is an imaging lens used for forming an image of an object on an image taking surface of a solid-state image sensor element, which comprises, in order from an object side towards an image surface side: a first lens which is a meniscus lens having a positive power whose convex surface faces the object side, a diaphragm, a second lens which is a meniscus lens having a positive power whose convex surface faces the image surface side, and a third lens which is a biconcave lens having a negative power, wherein conditions expressed by each of following expressions (1)–(4) are to be satisfied;

$$1.3 \geq L/fl \geq 1 \quad (1)$$

$$0.8 \geq f1/fl \geq 0.6 \quad (2)$$

$$0.12 \geq f1/f2 \geq 0 \quad (3)$$

$$-0.1 \geq f1/f3 \geq -0.25 \quad (4)$$

where,

L: entire length of the lens system (distance from the surface of the object side of the first lens to the image taking surface [air reduced length])

fl: focal distance of the entire lens system $f_1$: focal distance of the first lens $f_2$: focal distance of the second lens $f_3$: focal distance of the third lens In the first aspect of the present invention, the first lens is a meniscus lens having a positive power whose convex surface faces the object side, the second lens which is a meniscus lens having a positive power whose convex surface faces the image surface side, a third lens which is a biconcave lens having a negative power, and a diaphragm is disposed between the first lens and the second lens. In addition, the conditions expressed by each of the expressions (1)–(4) are satisfied. With this, it is possible to reduce the size and weight, maintain an excellent optical performance, improve productivity, and secure high telecentricity and back focus distance. In addition, the shape of the second lens allows balance between peripheral areas and the center area.

The productivity herein means not only the productivity for mass-producing imaging lens (for example, moldability, cost, and the like when imaging lens are mass-produced by injection molding), but also easiness of processing, manufacture, etc. of equipment (for example, easiness of processing and the like of a mold used for injection molding), which is used for manufacturing the imaging lens.

An imaging lens according to a second aspect is the imaging lens according to the first aspect, wherein, further, a condition expressed by a following expression (5) is to be satisfied;

$$-1.5 \geq r_5/r_6 \geq -10 \quad (5)$$

where, $r_5$: center radius curvature of the object side face of the third lens $r_6$: center radius curvature of the image surface side face of the third lens In the second aspect of the invention, further, the expression (5) is satisfied. Thereby, the reduction in size and weight and the maintaining of the optical performance can be compatible with further certainty.

An imaging lens according to a third aspect of the present invention is the imaging lens according to the first or second aspect, wherein, further, a condition expressed by a following expression (6) is to be satisfied;

$$0.2 \geq d_2/fl \geq 0.12 \quad (6)$$

where, $d_2$: distance between the first lens and the second lens on the optical axis In the third aspect of the invention, further, the expression (6) is satisfied. Thereby, the required back focus distance can be secured while achieving more reduction of the size and weight and improving productivity.

An imaging lens according to a fourth aspect is the imaging lens according to any one of aspects 1–3, wherein, further, a condition expressed by a following expression (7) is to be satisfied;

$$0.2 \geq d_3/fl \geq 0.01 \quad (7)$$

where, $d_3$: center thickness of the second lens

In the fourth aspect of the invention, further, the expression (7) is satisfied. Thereby, further reduction of the size and weight can be achieved and productivity improved.

An imaging lens according to a fifth aspect is the imaging lens according to any one of aspects 1–4, wherein, further, a condition expressed by a following expression (8) is to be satisfied;

$$0.11 \geq d_4/fl \geq 0.03 \quad (8)$$

where, $d_4$: distance between the second lens and the third lens on the optical axis In the fifth aspect of the invention, further, the expression (8) is satisfied. Thereby, optical performance and productivity can be improved.

An imaging lens according to a sixth aspect is the imaging lens according to any one of aspects 1–5, wherein, further, a condition expressed by a following expression (9) is to be satisfied;

$$0.25 \geq r_1/r_2 \geq 0.05 \quad (9)$$

where, $r_1$: center radius curvature of the object side face of the first lens $r_2$: center radius curvature of the image surface side face of the first lens In the sixth aspect of the invention, further, the expression (9) is satisfied. Thereby, the required back focus distance can be secured while achieving more reduction of the size and weight and improving productivity.

With the imaging lens according to the first aspect of the present invention, it is possible to achieve an imaging lens that can maintain excellent optical performance, while allowing further reduction in size and weight.

Further, in addition to the effects of the imaging lens according to the first aspect, the imaging lens according to the second aspect can achieve an imaging lens that has more excellent optical performance and is more reduced in size and weight.

Further, in addition to the effects of the imaging lens according to the first or second aspect, the imaging lens according to the third aspect can achieve an imaging lens that has more excellent productivity and is more reduced in size and weight.

Further, in addition to the effects of the imaging lens according to the first to third aspect, the imaging lens according to the fourth aspect can achieve an imaging lens that has more excellent productivity and is more reduced in size and weight.

Further, in addition to the effects of the imaging lens according to the first to fourth aspect, the imaging lens according to the fifth aspect can achieve an imaging lens that has more excellent productivity and optical performance.

Further, in addition to the effects of the imaging lens according to the first to fifth aspect, the imaging lens according to the sixth aspect can achieve an imaging lens that has more excellent productivity and is more reduced in size and weight.

BRIEF DESCRIPTION OF THE DRAWINGS

FIG. 13 shows graphs for describing the spherical aberration, astigmatism, and distortion of the imaging lens shown in FIG. 12;

DETAILED DESCRIPTION OF THE PREFERRED EMBODIMENT

An embodiment of the imaging lens according to the present invention will be described hereinafter by referring to FIG. 1.

Figure 1:
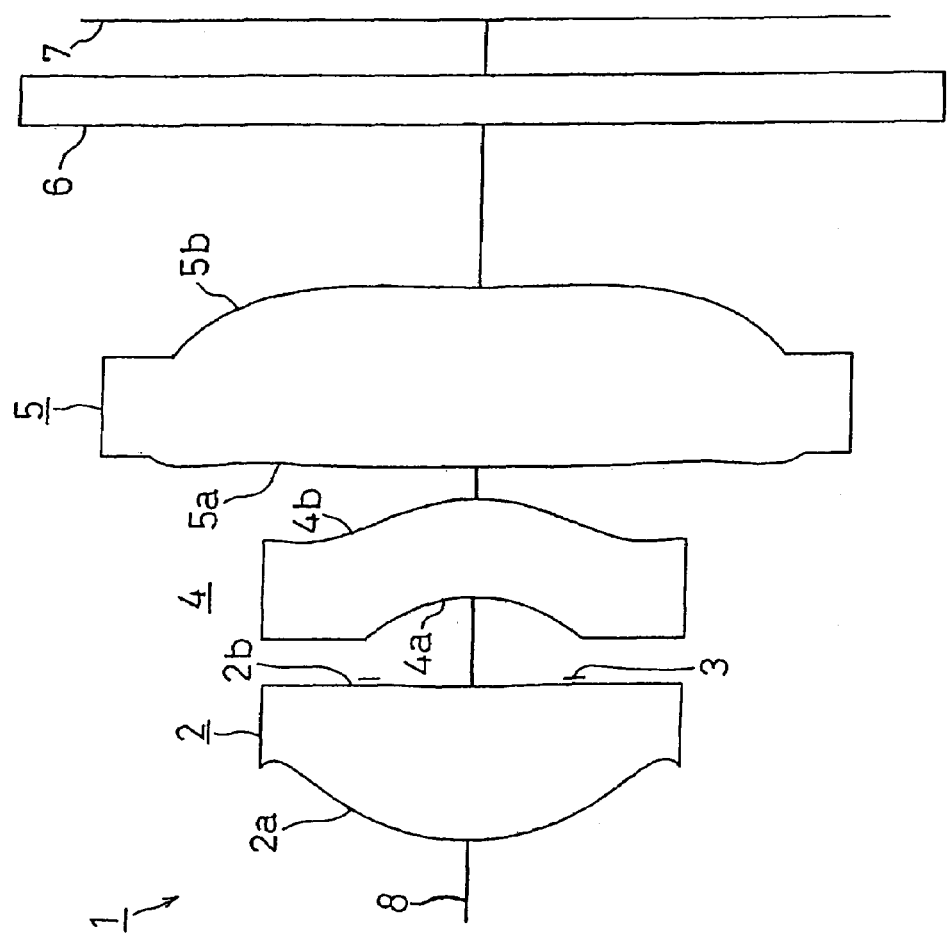
FIG. 1 is a schematic diagram for showing an embodiment of the imaging lens according to the present invention.

As shown in FIG. 1, an imaging lens 1 of the embodiment comprises, in order from the object side towards the image surface side, a resin-type first lens 2 which is a meniscus lens having a positive power with its convex surface facing the object side, a diaphragm 3, a resin-type second lens 4 which is a meniscus lens having a positive power with its convex surface facing the image surface side, and a resin-type third lens 5 which is a biconcave lens having a negative power.

Herein, each of the lens surfaces 2a, 4a, and 5a of the first lens 2, the second lens 4, and the third lens 5 on the object side is respectively referred to as first faces 2a, 4a, and 5a of the lenses 2, 4, and 5. The lens surfaces 2b, 4b, and 5b on the image surface side are respectively referred to as second faces 2b, 4b, and 5b of the lenses 2, 4, and 5.

On the second face 5b side of the third lens 5, there are disposed various filters 6 such as a cover glass, an IR cut filter, and a lowpass filter, and an image taking surface 7 which is a light-receiving surface of an image sensor element such as a CCD or a CMOS, respectively. The various filters 6 may be omitted as required.

Further, in the embodiment, the imaging lens 1 is to satisfy each condition expressed by the following expressions (1)-(4).

$$1.3 \geq L/fl \geq 1.0 \quad (1)$$

$$0.8 \geq f_1/fl \geq 0.6 \quad (2)$$

$$0.12 \geq f_1/f_2 \geq 0 \quad (3)$$

$$-0.1 \geq f_1/f_3 \geq -0.25 \quad (4)$$

where, L in the expression (1) is the entire length of the lens system, i.e. the distance between the first face 2 of the first lens 2 and the image taking surface 7 (air reduced length). fl in the expressions (1) and (2) is the focal distance of the entire lens system. $f_1$ in the expressions (2) to (4) is the focal distance of the first lens 2. Further, $f_2$ in the expression (3) is the focal distance of the second lens 4. Still further, $f_3$ in the expressions (4) is the focal distance of the third lens 5.

When the value of the L/fl exceeds the value (1.3) shown in the expression (1), the entire optical system becomes too large.

At the same time, when the L/fl becomes below the value (1.0) shown in the expression (1), the entire optical system becomes too small. Thus, the productivity is deteriorated and it becomes difficult to maintain the optical performance.

Accordingly, with the embodiment, it becomes possible to reduce the size and weight of the imaging lens while maintaining an excellent optical performance and productivity through setting the value of L/fl to satisfy the expression (1).

It is more preferable for the relation between L and fl to satisfy an expression 1. $3 \geq L/fl \geq 1.15$.

Further, when the value of $f_1/fl$ exceeds the value (0.8) shown in the expression (2), the back focus distance becomes too long. Thus, it becomes difficult to reduce the size of the optical system.

At the same time, when the value of $f_1/fl$ becomes below the value (0.6), the power of the first lens 2 becomes so strong that the productivity is deteriorated. In addition, it becomes difficult to secure the necessary back focus distance.

Accordingly, with the embodiment, it becomes possible to secure the necessary back focus distance, while more effectively reducing the size and weight and further improving the productivity of the imaging lens 1, through setting the value of $f_1/fl$ to satisfy the expression (2).

It is more preferable for the relation between $f_1$ and fl to satisfy an expression 0. $8 \geq f_1/fl \geq 0.65$.

Further, when the value of $f_1/f_2$ exceeds the value (0.12) shown in the expression (3), the power of the first lens 2 becomes relatively too weak. Thus, it becomes difficult to reduce the size of the optical system. In addition, the power of the first lens 2 and that of the second lens 4 becomes unbalanced, thereby deteriorating the optical performance.

At the same time, when the value of $f_1/f_2$ is near the value (0) shown in the expression (3), the power of the first lens 2 becomes relatively too strong. Thus, the productivity is deteriorated. In addition, either one of the first lens 2 or the second lens 4 has a negative power. Therefore, the desired optical performance cannot be obtained. Further, the power of the first lens 2 and that of the second lens 4 become unbalanced, thereby deteriorating the optical performance.

Accordingly, with the embodiment, it becomes possible to maintain an excellent optical performance with further certainty, while further reducing the size and weight of the imaging lens 1, through setting the value of $f_1/f_2$ to satisfy the expression (3).

It is more preferable for the relation between $f_1$ and $f_2$ to satisfy an expression 0. $1 \geq f_1/f_2 \geq 0.07$.

Still further, when the value of $f_1/f_3$ exceeds the value (−0.1) shown in the expression (4), the power of the first lens 2 becomes relatively too strong. Thus, the productivity is deteriorated and the power of the first lens 2 and that of the second lens 4 becomes unbalanced. Thus, the optical performance cannot be maintained.

At the same time, when the value of $f_1/f_3$ is below the value (−0.25) shown in the expression (4), the power of the third lens 5 becomes relatively too strong. Thus, it becomes difficult to reduce the size and weight of the optical system. In addition, the power of the first lens 2 and that of the third lens 5 become unbalanced, thereby deteriorating the optical performance.

Accordingly, with the embodiment, it is possible to maintain an excellent optical performance with further certainty, while further reducing the size and weight, through setting the value of $f_1/f_2$ to satisfy the expression (3).

It is more preferable for the relation between $f_1$ and $f_3$ to satisfy an expression $-0.1 \geq f_1/f_3 \geq -0.22$.

In addition to the above-described structures, the following expression (5) is satisfied in the embodiment.

$$-1.5 \geq r_5/r_6 \geq 10 \qquad (5)$$

where, $r_5$ in the expression (5) is the center radius curvature of the first face 5a of the third lens 5. $r_6$ is the center radius curvature of the second face 5b of the third lens 5.

When the value of $r_5/r_6$ is out of the range of the expression (5), it becomes difficult for the reduction of the size and weight of the entire optical system and the maintaining of an excellent optical performance to be compatible.

Accordingly, with the embodiment, it becomes possible to make compatible the reduction of the size and weight of the entire optical system and the maintaining of an excellent optical performance with further certainly, through satisfying the expression (5).

It is more preferable for the relation between $r_5$ and $r_6$ to satisfy an expression $-3 \geq r_5/r_6 \geq 7$.

In addition to the above-described structures, the following expression (6) is satisfied in the embodiment.

$$0.2 \geq d_2/fl \geq 0.12 \qquad (6)$$

where, $d_2$ in the expression (6) is the distance between the first lens 2 and the second lens 4 on the optical axis 8.

When the value of $d_2/fl$ exceeds the value (0.2) in the expression (6), it becomes difficult to secure the necessary back focus distance. In addition, the height of light ray passing through the second face 5b of the third lens 5 becomes too high. Thus, the third lens 5 is increased in size and production becomes difficult.

At the same time, when the value of $d_2/fl$ is below the value (0.12) in the expression (6), the back focus distance becomes too long. Thus, it is difficult to reduce the size of the entire optical system. In addition, it becomes difficult to insert the diaphragm that effectively controls the amount of light.

Accordingly, with the embodiment, it becomes possible to more effectively secure the necessary back focus, while further effectively reducing the size and weight of the imaging lens 1 and further improving productivity, through setting the value of $d_2/fl$ to satisfy the expression (6).

It is more preferable for the relation between $d_2$ and fl to satisfy an expression $0.18 \geq d_2/fl \geq 0.13$.

In addition to the above-described structures, the following expression (7) is satisfied in the embodiment.

$$0.2 \geq d_3/fl \geq 0.01 \qquad (7)$$

where, $d_3$ in the expression (7) is the center thickness of the second lens 4.

When the value of $d_3/fl$ exceeds the value (0.2) in the expression (7), the back focus distance becomes too long. Thus, it becomes difficult to reduce the size of the entire optical system. In addition, the height of light ray passing through the second face 5b of the third lens 5 becomes too high. Thus, the third lens 5 is increased in size and production becomes difficult.

At the same time, when the value of $d_3/fl$ is below the value (0.01) in the expression (7), it becomes difficult to produce the second lens 4.

Accordingly, with the embodiment, it becomes possible to more effectively reduce the size and weight of the imaging lens 1 and further improve productivity, through setting the value of $d_3/fl$ to satisfy the expression (7).

It is more preferable for the relation between $d_3$ and fl to satisfy an expression $0.18 \geq d_3/fl \geq 0.1$.

In addition to the above-described structures, the following expression (8) is satisfied in the embodiment.

$$0.11 \geq d_4/fl \geq 0.03 \qquad (8)$$

where, $d_4$ in the expression (8) is the distance between the second lens 4 and the third lens 5 on the optical axis 8.

When the value of $d_4/fl$ exceeds the value (0.11) in the expression (8), the height of light ray passing through the second face 5b of the third lens 5 becomes too high. Thus, the third lens 5 is increased in size and production becomes difficult.

At the same time, when the value of $d_4/fl$ is below the value (0.03) in the expression (8), it becomes difficult to insert the diaphragm that effectively controls the amount of light.

Accordingly, with the embodiment, it becomes possible to further improve the optical performance and the productivity, through setting the value of $d_4/fl$ to satisfy the expression (8).

It is more preferable for the relation between $d_4$ and fl to satisfy an expression $0.06 \geq d_4/fl \geq 0.03$.

In addition to the above-described structures, the following expression (9) is satisfied in the embodiment.

$$0.25 \geq r_1/r_2 \geq 0.05 \qquad (9)$$

where, $r_1$ in the expression (9) is the center radius curvature of the first face 2a of the first lens 2. $r_2$ is the center radius curvature of the second face 2b of the first lens 2.

When the value of $r_1/r_2$ exceeds the value (0.25) in the expression (9), the back focus distance becomes too long. Thus, it becomes difficult to reduce the size of the optical system.

At the same time, when the value of $r_1/r_2$ is below the value (0.05) in the expression (9), the productivity of the first lens 2 is deteriorated. In addition, it becomes difficult to secure the necessary back focus distance.

Accordingly, with the embodiment, it becomes possible to secure the necessary back focus distance, while more effectively reducing the size and weight of the imaging lens and improving the productivity, through setting the value of $r_1/r_2$ to satisfy the expression (9).

It is more preferable for the relation between $r_1$ and $r_2$ to satisfy an expression $0.25 \geq r_1/r_2 \geq 0.1$.

EXAMPLES

Next, EXAMPLES of the present invention will be described by referring to FIG. 2 to FIG. 23.

In the EXAMPLES, F no denotes F number, w denotes a half view angle, and r denotes a center radius curvature. Further, d denotes a distance to the next optical surface, nd denotes the index of refraction to the d line, and vd denotes the Abbe number (d line-based).

k, A, B, C, and D denote each coefficient in a following expression (10). Specifically, the shape of the aspherical surface of the lens is expressed by the following expression provided that the direction of the optical axis 8 is taken as the Z axis, the direction orthogonal to the optical axis 8 as the X axis (the height direction), the traveling direction of light is positive, k is the constant of cone, A, B, C, and D are the aspherical coefficients, and r is the center radius curvature.

$$Z(X) = r^{-1}X^2 / [1 + \{1-(k+1)r^{-2}X^2\}^{1/2}] + AX^4 + BX^6 + CX^8 + DX^{10} \quad (10)$$

In the following EXAMPLES, reference code E used for a numerical value denoting the constant of cone and the aspherical coefficient indicates that the numerical value following E is an exponent having 10 as the base and that the numerical value before E is multiplied by the numerical value denoted by the exponent having 10 as the base. For example, 3.9E-2 denotes $3.9 \times 10^{-2}$.

First Example

Figure 2:
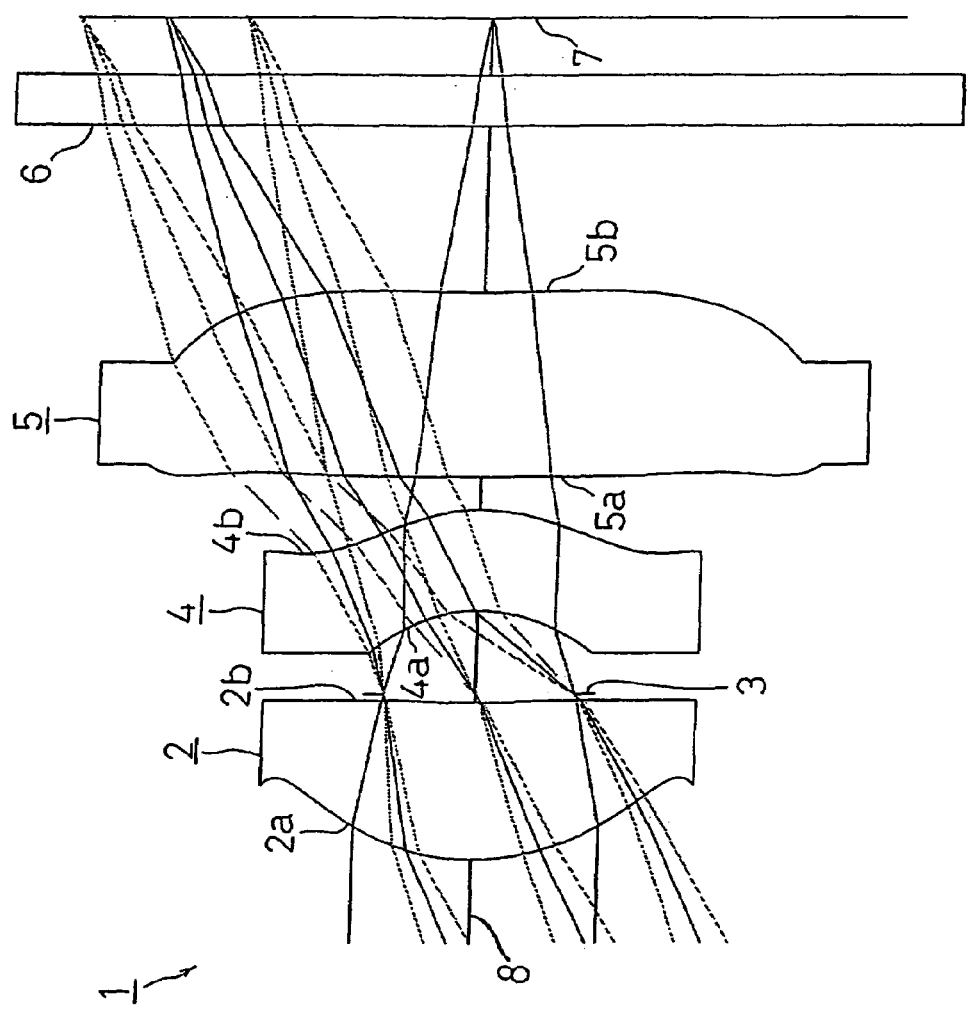
FIG. 2 is a schematic diagram for showing FIRST EXAMPLE of the imaging lens according to the present invention.

FIG. 2 shows FIRST EXAMPLE of the present invention. The imaging lens 1 in FIRST EXAMPLE shown in FIG. 2 is the same imaging lens 1 as that shown in FIG. 1.

The imaging lens 1 of FIRST EXAMPLE was set under the following condition.

(Lens Data)
fl = 4.14 mm, F no = 2.8

| Face Number | r | d | nd | vd |
|---|---|---|---|---|
| (Object Point) | | | | |
| 1 (First Face of First Lens) | 1.43 | 0.95 | 1.5310 | 56.0 |
| 2 (Second Face of First Lens) | 8.81 | 0.05 | | |
| 3 (Diaphragm) | 0.00 | 0.50 | | |
| 4 (First Face of Second Lens) | -0.92 | 0.60 | 1.5850 | 30.0 |
| 5 (Second Face of Second Lens) | -1.12 | 0.20 | | |
| 6 (First Face of Third Lens) | -40.98 | 1.10 | 1.5310 | 56.0 |
| 7 (Second Face of Third Lens) | 9.52 | 1.00 | | |
| 8 (First Face of Cover Glass) | 0.00 | 0.30 | 1.5168 | 64.2 |
| 9 (Second Face of Cover Glass) (Image Surface) | 0.00 | | | |

| Face Number | k | A | B | C | D |
|---|---|---|---|---|---|
| 1 | -1.0 | 3.9E-2 | 9.7E-3 | 1.8E-2 | -3.2E-2 |
| 2 | 3.0E+1 | -6.0E-3 | -2.4E-1 | 2.0E-1 | 0 |
| 4 | 3.8E-1 | 1.8E-1 | 2.1E-1 | 1.8E-1 | 0 |
| 5 | -4.3E-1 | 1.7E-1 | 1.1E-1 | -2.6E-2 | -3.2E-3 |
| 6 | -8.4E+1 | 3.3E-2 | -9.9E-3 | -1.7E-3 | 6.1E-4 |
| 7 | 1.0E+1 | -7.4E-2 | 1.8E-2 | -3.0E-3 | 2.3E-8 |

Under such conditions, L/fl = 1.19 was achieved, thereby satisfying the expression (1).
$f_1/fl = 0.739$ was achieved, thereby satisfying the expression (2).
$f_1/f_2 = 0.0395$ was achieved, thereby satisfying the expression (3).
$f_1/f_3 = -0.2132$ was achieved, thereby satisfying the expression (4).
$r_5/r_6 = -4.21$ was achieved, thereby satisfying the expression (5).
$d_2/fl = 0.133$ was achieved, thereby satisfying the expression (6).
$d_3/fl = 0.145$ was achieved, thereby satisfying the expression (7).
$d_4/fl = 0.048$ was achieved, thereby satisfying the expression (8).
$r_1/r_2 = 0.162$ was achieved, thereby satisfying the expression (9).

Figure 3:
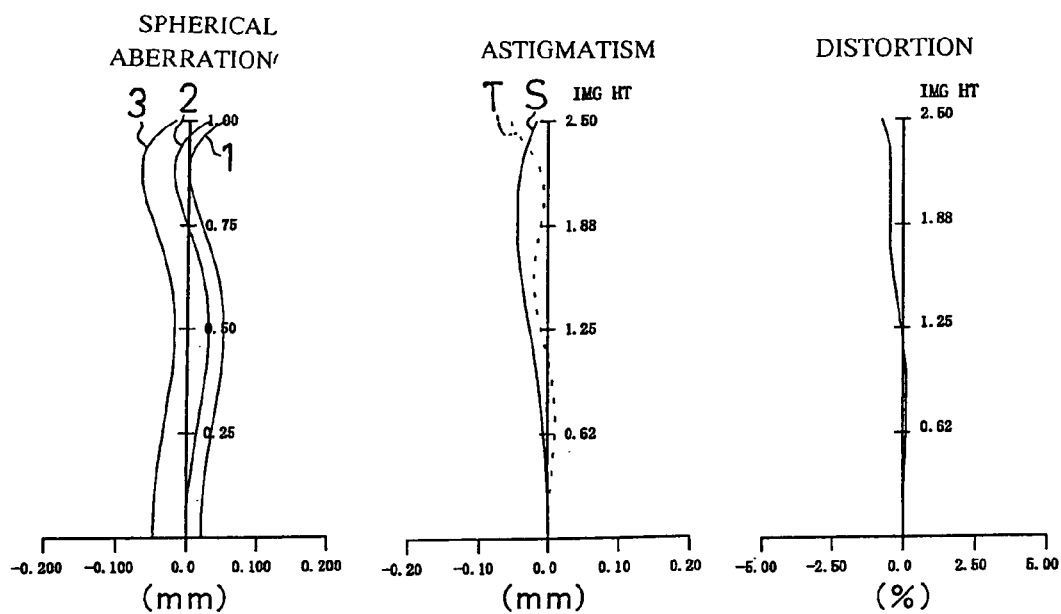
FIG. 3 shows graphs for describing the spherical aberration, astigmatism, and distortion of the imaging lens shown in FIG. 2.

FIG. 3 shows the spherical aberration, astigmatism, and distortion of the imaging lens 1 of the FIRST EXAMPLE.

According to the result, each of the spherical aberration, astigmatism, distortion, and lateral aberration was satisfied. It can be seen from the result that a sufficiently excellent optical property can be obtained.

Second Example

Figure 4:
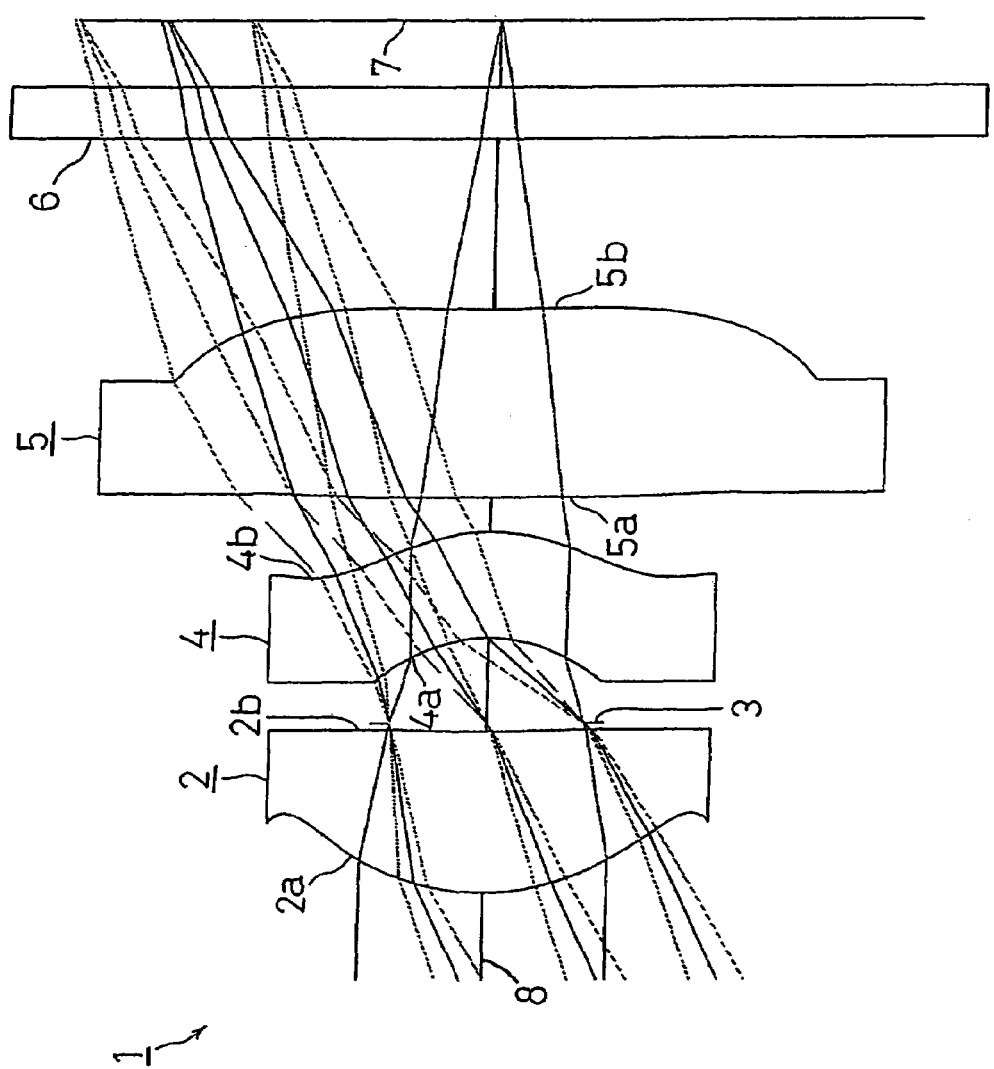
FIG. 4 is a schematic diagram for showing SECOND EXAMPLE of the imaging lens according to the present invention.

FIG. 4 shows SECOND EXAMPLE of the present invention. The imaging lens 1 of SECOND EXAMPLE shown in FIG. 4 was set under the following condition.

(Lens Data)
fl = 4.12 mm, F no = 2.8

| Face Number | r | d | nd | vd |
|---|---|---|---|---|
| (Object Point) | | | | |
| 1 (First Face of First Lens) | 1.46 | 0.95 | 1.5310 | 56.0 |
| 2 (Second Face of First Lens) | 10.00 | 0.05 | | |
| 3 (Diaphragm) | 0.00 | 0.50 | | |
| 4 (First Face of Second Lens) | -0.91 | 0.62 | 1.5850 | 30.0 |
| 5 (Second Face of Second Lens) | -1.11 | 0.20 | | |
| 6 (First Face of Third Lens) | -50.00 | 1.10 | 1.5310 | 56.0 |
| 7 (Second Face of Third Lens) | 11.11 | 1.00 | | |
| 8 (First Face of Cover Glass) | 0.00 | 0.30 | 1.5168 | 64.2 |
| 9 (Second Face of Cover Glass) (Image Surface) | 0.00 | | | |

| Face Number | k | A | B | C | D |
|---|---|---|---|---|---|
| 1 | -1.0 | 3.8E-2 | 8.3E-3 | 1.7E-2 | -3.2E-2 |
| 2 | 3.4E+1 | -5.6E-3 | -2.4E-1 | 2.0E-1 | 0 |
| 4 | 3.3E-1 | 1.8E-1 | 2.1E-1 | 2.1E-1 | 0 |
| 5 | -4.3E-1 | 1.7E-1 | 1.1E-1 | -2.5E-2 | -2.7E-3 |
| 6 | 4.3E+2 | 3.2E-2 | -9.8E-3 | -1.6E-3 | 6.1E-4 |
| 7 | 1.6E+1 | -7.3E-2 | 1.8E-2 | -3.0E-3 | 1.2E-5 |

Under such conditions, L/fl = 1.21 was achieved, thereby satisfying the expression (1).
$f_1/fl = 0.750$ was achieved, thereby satisfying the expression (2).
$f_1/f_2 = 0.0512$ was achieved, thereby satisfying the expression (3).
$f_1/f_3 = -0.1824$ was achieved, thereby satisfying the expression (4).
$r_5/r_6 = -4.50$ was achieved, thereby satisfying the expression (5).
$d_2/fl = 0.133$ was achieved, thereby satisfying the expression (6).
$d_3/fl = 0.150$ was achieved, thereby satisfying the expression (7).
$d_4/fl = 0.049$ was achieved, thereby satisfying the expression (8).
$r_1/r_2 = 0.146$ was achieved, thereby satisfying the expression (9).

Figure 5:
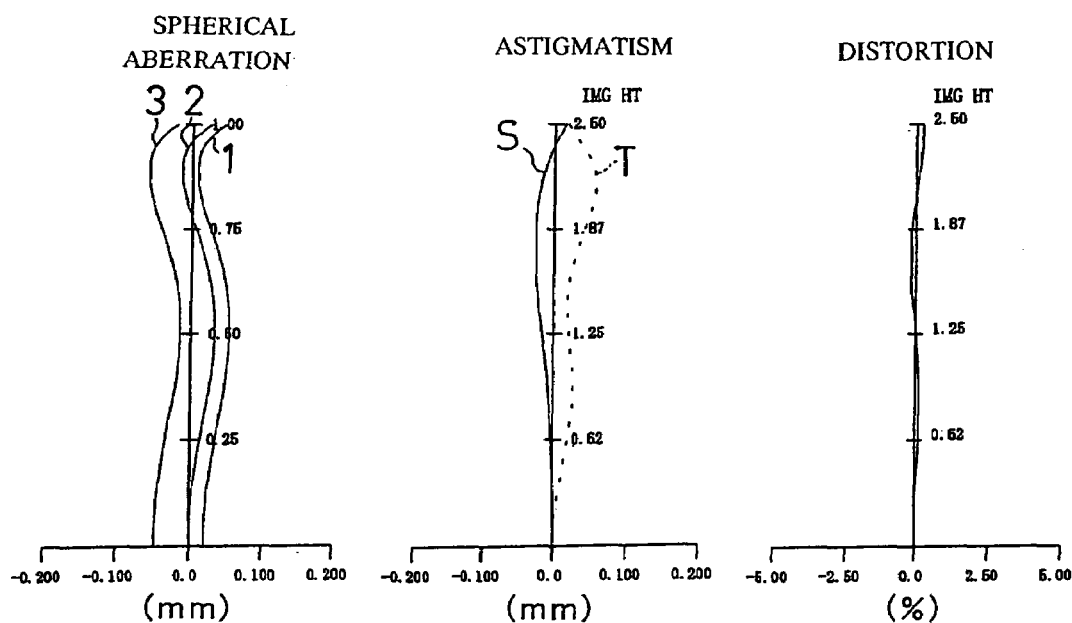
FIG. 5 shows graphs for describing the spherical aberration, astigmatism, and distortion of the imaging lens shown in FIG. 4.

FIG. 5 shows the spherical aberration, astigmatism, and distortion of the imaging lens 1 of the SECOND EXAMPLE.

According to the result, each of the spherical aberration, astigmatism, distortion, and lateral aberration was satisfied. It can be seen from the result that a sufficiently excellent optical property can be obtained.

Third Example

Figure 6:
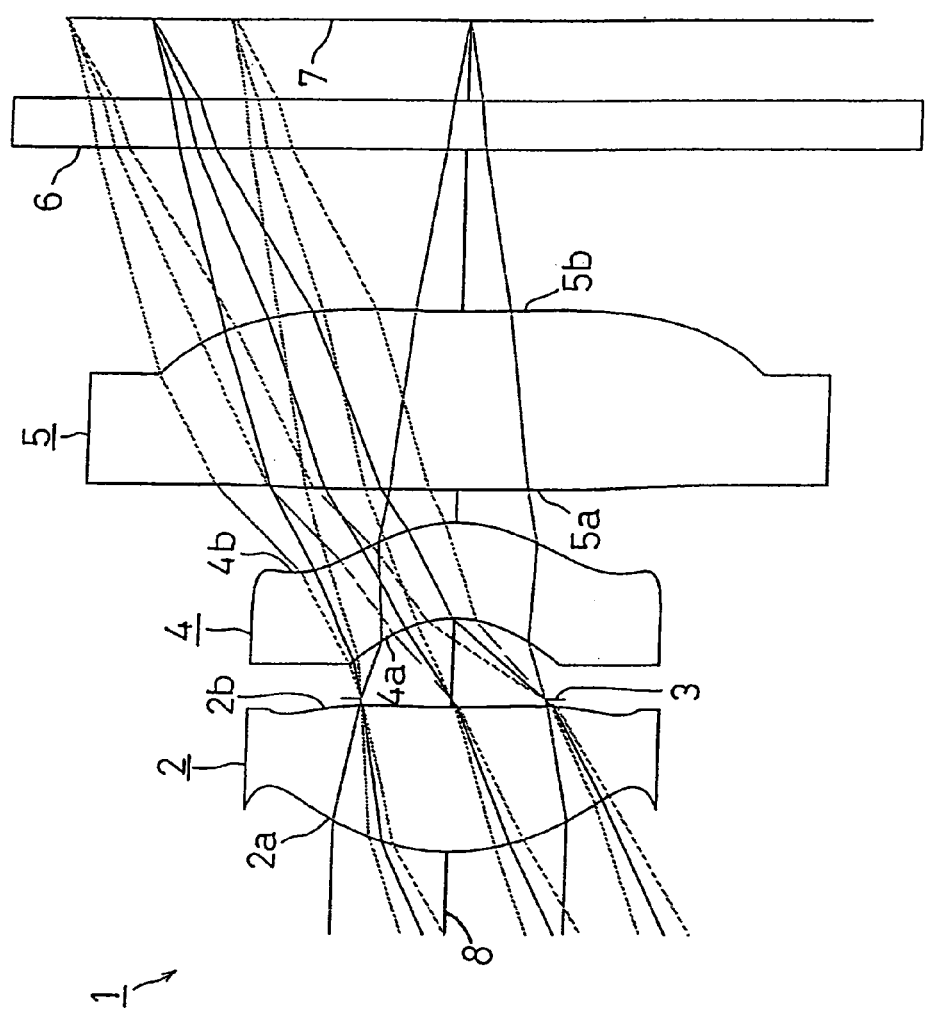
FIG. 6 is a schematic diagram for showing THIRD EXAMPLE of the imaging lens according to the present invention.

FIG. 6 shows THIRD EXAMPLE of the present invention. The imaging lens 1 of THIRD EXAMPLE shown in FIG. 6 was set under the following condition.

Lens Data
fl = 4.09 mm, F no = 2.8

| Face Number | r | d | nd | vd |
|---|---|---|---|---|
| (Object Point) | | | | |
| 1 (First Face of First Lens) | 1.44 | 0.90 | 1.5310 | 56.0 |
| 2 (Second Face of First Lens) | 11.11 | 0.05 | | |
| 3 (Diaphragm) | 0.00 | 0.50 | | |
| 4 (First Face of Second Lens) | -0.75 | 0.59 | 1.5850 | 30.0 |
| 5 (Second Face of Second Lens) | -0.94 | 0.20 | | |

-continued

Lens Data
fl = 4.09 mm, F no = 2.8

| | | | | |
|---|---|---|---|---|
| 6 (First Face of Third Lens) | −50.00 | 1.10 | 1.5310 | 56.0 |
| 7 (Second Face of Third Lens) | 11.77 | 1.00 | | |
| 8 (First Face of Cover Glass) | 0.00 | 0.30 | 1.5168 | 64.2 |
| 9 (Second Face of Cover Glass) (Image Surface) | 0.00 | | | |

| Face Number | k | A | B | C | D |
|---|---|---|---|---|---|
| 1 | −9.8E−1 | 3.5E−2 | 4.7E−3 | 2.9E−2 | −5.4E−2 |
| 2 | −4.7E+1 | −1.3E−2 | −2.3E−1 | 1.6E−1 | 0 |
| 4 | −1.3E−2 | 3.2E−1 | −1.8E−1 | 1.4 | 0 |
| 5 | −4.4E−1 | 1.4E−1 | 2.2E−1 | −2.1E−2 | −5.0E−3 |
| 6 | 7.3E+2 | 2.9E−2 | −8.2E−3 | −1.1E−3 | 4.9E−4 |
| 7 | 7.2 | −7.2E−2 | 1.8E−2 | −3.1E−3 | 6.1E−5 |

Under such conditions, L/fl = 1.22 was achieved, thereby satisfying the expression (1).
$f_1/fl$ = 0.733 was achieved, thereby satisfying the expression (2).
$f_1/f_2$ = 0.0681 was achieved, thereby satisfying the expression (3).
$f_1/f_3$ = −0.1690 was achieved, thereby satisfying the expression (4).
$r_5/r_6$ = −4.25 was achieved, thereby satisfying the expression (5).
$d_2/fl$ = 0.134 was achieved, thereby satisfying the expression (6).
$d_3/fl$ = 0.144 was achieved, thereby satisfying the expression (7).
$d_4/fl$ = 0.049 was achieved, thereby satisfying the expression (8).
$r_1/r_2$ = 0.130 was achieved, thereby satisfying the expression (9).

Figure 7:
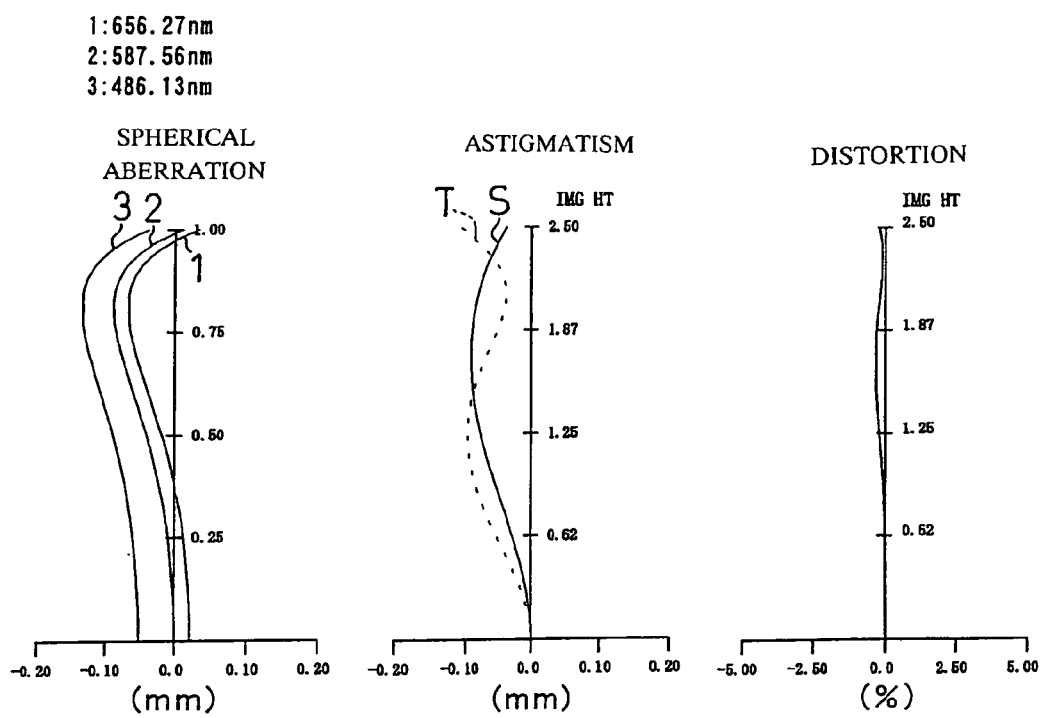
FIG. 7 shows graphs for describing the spherical aberration, astigmatism, and distortion of the imaging lens shown in FIG. 6.

FIG. 7 shows the spherical aberration, astigmatism, and distortion of the imaging lens 1 of the THIRD EXAMPLE.

According to the result, each of the spherical aberration, astigmatism, distortion, and lateral aberration was satisfied. It can be seen from the result that a sufficiently excellent optical property can be obtained.

Fourth Example

Figure 8:
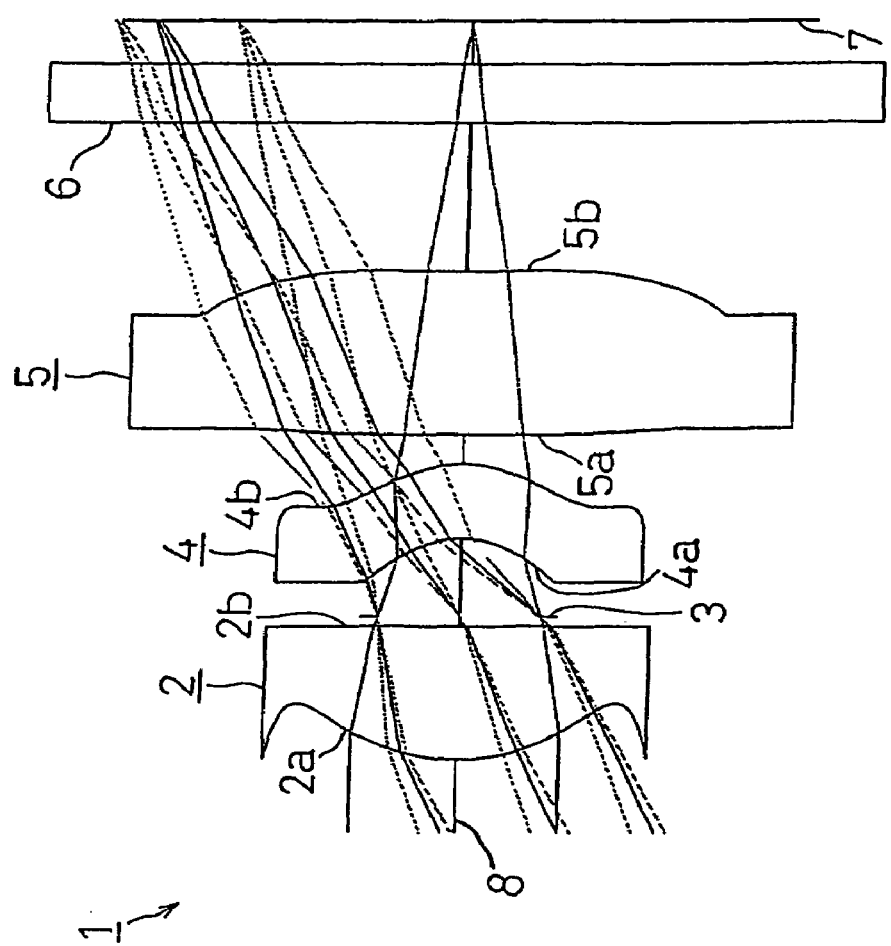
FIG. 8 is a schematic diagram for showing FOURTH EXAMPLE of the imaging lens according to the present invention.

FIG. 8 shows FOURTH EXAMPLE of the present invention. The imaging lens 1 of FOURTH EXAMPLE shown in FIG. 8 was set under the following condition.

(Lens Data)
fl = 3.06 mm, F no = 2.8

| Face Number | r | d | nd | vd |
|---|---|---|---|---|
| (Object Point) | | | | |
| 1 (First Face of First Lens) | 1.08 | 0.68 | 1.5310 | 56.0 |
| 2 (Second Face of First Lens) | 8.33 | 0.05 | | |
| 3 (Diaphragm) | 0.00 | 0.40 | | |
| 4 (First Face of Second Lens) | −0.56 | 0.38 | 1.5850 | 30.0 |
| 5 (Second Face of Second Lens) | −0.69 | 0.15 | | |
| 6 (First Face of Third Lens) | −37.50 | 0.83 | 1.5310 | 56.0 |
| 7 (Second Face of Third Lens) | 8.82 | 0.75 | | |
| 8 (First Face of Cover Glass) | 0.00 | 0.30 | 1.5168 | 64.2 |
| 9 (Second Face of Cover Glass) (Image Surface) | 0.00 | | | |

| Face Number | k | A | B | C | D |
|---|---|---|---|---|---|
| 1 | −9.8E−1 | 8.5E−2 | −4.3E−2 | 3.4E−1 | −8.8E−1 |
| 2 | −1.6E+2 | −4.4E−2 | −8.9E−1 | 7.0E−1 | 5.9E−1 |
| 4 | −1.7E−1 | 3.3E−1 | 2.3 | 4.1E−1 | −3.1 |
| 5 | −4.8E−1 | 3.7E−1 | 1.2 | −5.7E−1 | −6.8E−2 |
| 6 | 0 | 7.3E−2 | −3.1E−2 | −9.3E−3 | 5.1E−3 |
| 7 | 1.7E+1 | −1.8E−1 | 9.0E−2 | −2.6E−2 | 5.7E−4 |

Under such conditions, L/fl = 1.19 was achieved, thereby satisfying the expression (1).
$f_1/fl$ = 0.735 was achieved, thereby satisfying the expression (2).
$f_1/f_2$ = 0.0118 was achieved, thereby satisfying the expression (3).
$f_1/f_3$ = −0.1690 was achieved, thereby satisfying the expression (4).
$r_5/r_6$ = −4.25 was achieved, thereby satisfying the expression (5).
$d_2/fl$ = 0.147 was achieved, thereby satisfying the expression (6).
$d_3/fl$ = 0.123 was achieved, thereby satisfying the expression (7).
$d_4/fl$ = 0.049 was achieved, thereby satisfying the expression (8).
$r_1/r_2$ = 0.129 was achieved, thereby satisfying the expression (9).

Figure 9:
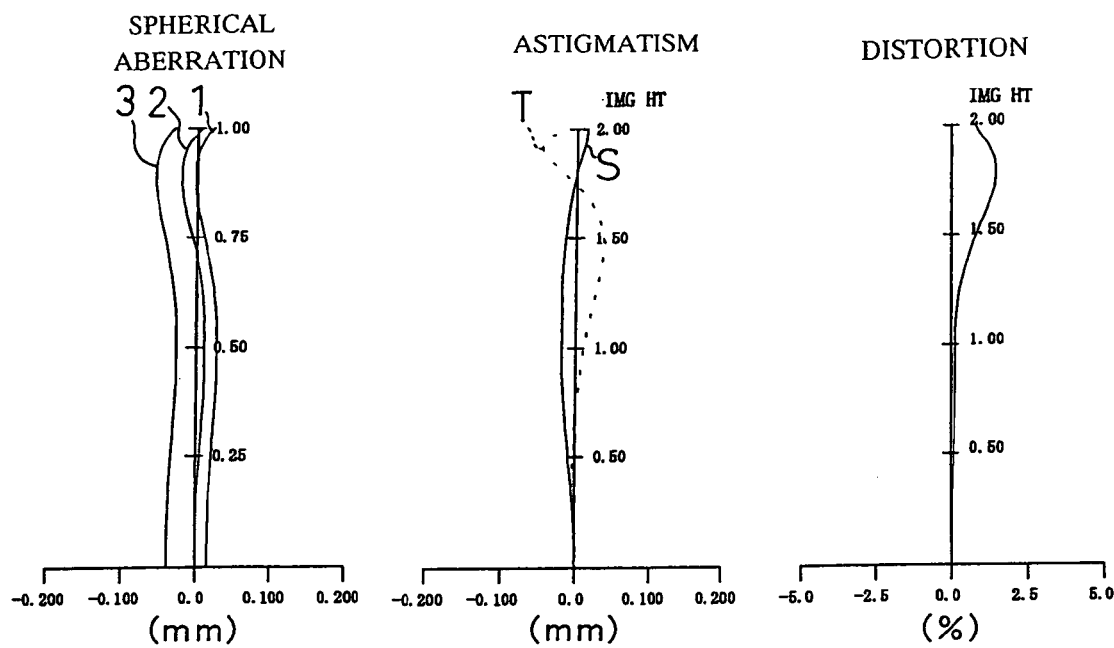
FIG. 9 shows graphs for describing the spherical aberration, astigmatism, and distortion of the imaging lens shown in FIG. 8.

FIG. 9 shows the spherical aberration, astigmatism, and distortion of the imaging lens 1 of the FOURTH EXAMPLE.

According to the result, each of the spherical aberration, astigmatism, distortion, and lateral aberration was satisfied. It can be seen from the result that a sufficiently excellent optical property can be obtained.

Fifth Example

Figure 10:
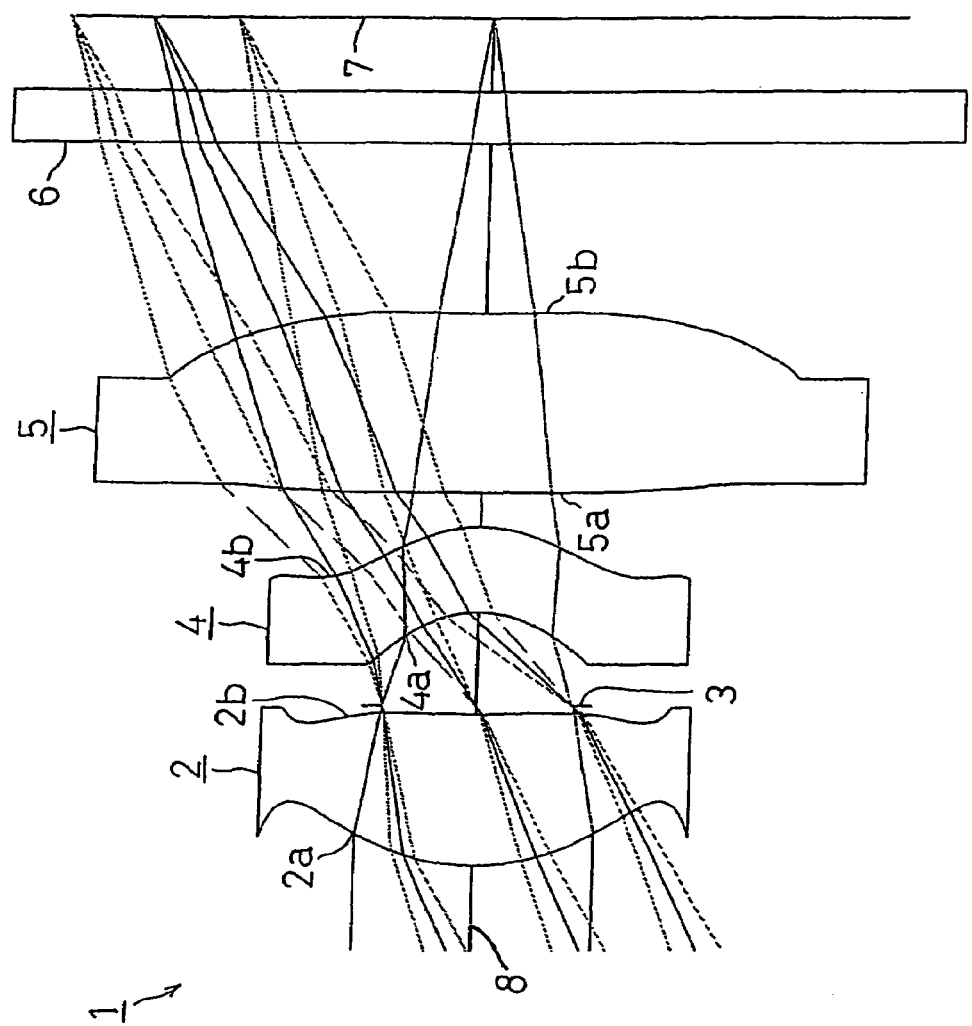
FIG. 10 is a schematic diagram for showing FIFTH EXAMPLE of the imaging lens according to the present invention.

FIG. 10 shows FIFTH EXAMPLE of the present invention. The imaging lens 1 of FIFTH EXAMPLE shown in FIG. 10 was set under the following condition.

(Lens Data)
fl = 4.07 mm, F no = 2.8

| Face Number | r | d | nd | vd |
|---|---|---|---|---|
| (Object Point) | | | | |
| 1 (First Face of First Lens) | 1.44 | 0.90 | 1.5310 | 56.0 |
| 2 (Second Face of First Lens) | 11.11 | 0.05 | | |
| 3 (Diaphragm) | 0.00 | 0.55 | | |
| 4 (First Face of Second Lens) | −0.71 | 0.50 | 1.5850 | 30.0 |
| 5 (Second Face of Second Lens) | −0.89 | 0.20 | | |
| 6 (First Face of Third Lens) | −40.00 | 1.05 | 1.5310 | 56.0 |
| 7 (Second Face of Third Lens) | 13.33 | 1.00 | | |
| 8 (First Face of Cover Glass) | 0.00 | 0.30 | 1.5168 | 64.2 |
| 9 (Second Face of Cover Glass) (Image Surface) | 0.00 | | | |

| Face Number | k | A | B | C | D |
|---|---|---|---|---|---|
| 1 | −9.2E−1 | 3.7E−2 | −2.4E−2 | 6.8E−2 | −7.8E−2 |
| 2 | 0 | −3.6E−2 | −1.8E−1 | 3.5E−1 | 9.0E−2 |
| 4 | −2.4E−1 | 1.4E−1 | 6.6E−1 | −1.5E−1 | −1.0E−1 |
| 5 | −6.0E−1 | 1.6E−1 | 2.9E−1 | −7.9E−2 | −1.6E−2 |
| 6 | 0 | 3.5E−2 | −9.7E−3 | −1.6E−4 | 2.1E−4 |
| 7 | −7.1E+2 | −7.1E−2 | 2.1E−2 | −3.6E−3 | 7.7E−5 |

Under such conditions, L/fl = 1.19 was achieved, thereby satisfying the expression (1).
$f_1/fl$ = 0.737 was achieved, thereby satisfying the expression (2).
$f_1/f_2$ = 0.0302 was achieved, thereby satisfying the expression (3).
$f_1/f_3$ = −0.1610 was achieved, thereby satisfying the expression (4).
$r_5/r_6$ = −3.00 was achieved, thereby satisfying the expression (5).
$d_2/fl$ = 0.147 was achieved, thereby satisfying the expression (6).
$d_3/fl$ = 0.123 was achieved, thereby satisfying the expression (7).
$d_4/fl$ = 0.049 was achieved, thereby satisfying the expression (8).
$r_1/r_2$ = 0.130 was achieved, thereby satisfying the expression (9).

Figure 11:
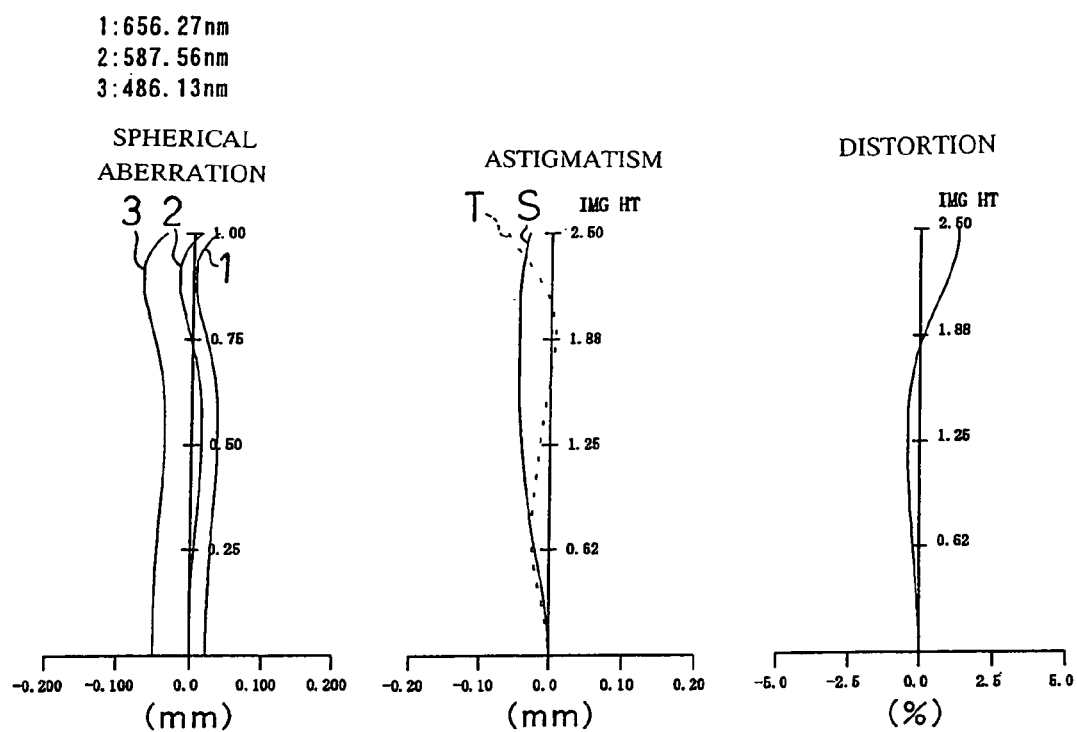
FIG. 11 shows graphs for describing the spherical aberration, astigmatism, and distortion of the imaging lens shown in FIG. 10.

FIG. 11 shows the spherical aberration, astigmatism, and distortion of the imaging lens 1 of the FIFTH EXAMPLE.

According to the result, each of the spherical aberration, astigmatism, distortion, and lateral aberration was satisfied.

It can be seen from the result that a sufficiently excellent optical property can be obtained.

Sixth Example

Figure 12:
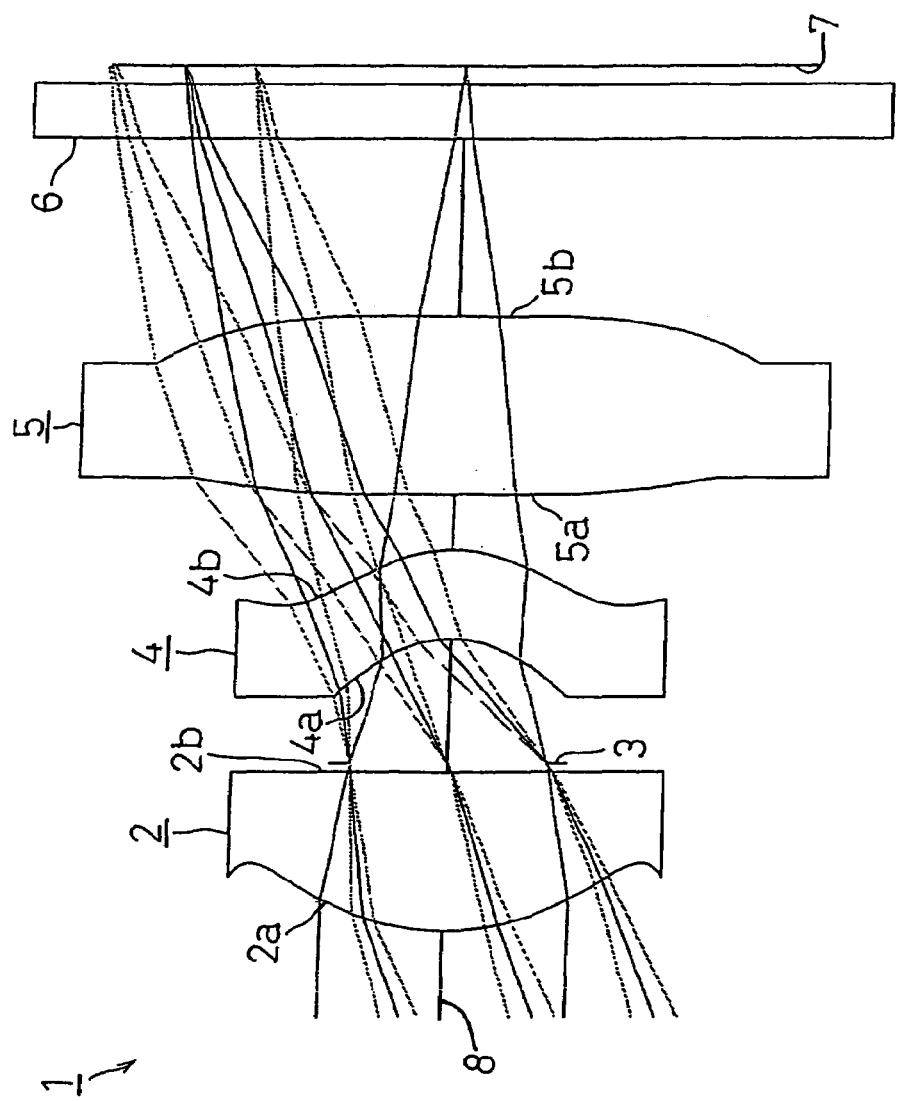
FIG. 12 is a schematic diagram for showing SIXTH EXAMPLE of the imaging lens according to the present invention.

FIG. 12 shows SIXTH EXAMPLE of the present invention. The imaging lens 1 of SIXTH EXAMPLE shown in FIG. 12 was set under the following condition.

(Lens Data)
fl = 4 mm, F no = 2.8

| Face Number | r | d | nd | vd |
|---|---|---|---|---|
| (Object Point) | | | | |
| 1 (First Face of First Lens) | 1.44 | 0.90 | 1.5310 | 56.0 |
| 2 (Second Face of First Lens) | 11.11 | 0.05 | | |
| 3 (Diaphragm) | 0.00 | 0.70 | | |
| 4 (First Face of Second Lens) | −0.69 | 0.50 | 1.5850 | 30.0 |
| 5 (Second Face of Second Lens) | −0.87 | 0.31 | | |
| 6 (First Face of Third Lens) | −40.00 | 1.00 | 1.5310 | 56.0 |
| 7 (Second Face of Third Lens) | 20.00 | 1.00 | | |
| 8 (First Face of Cover Glass) | 0.00 | 0.30 | 1.5168 | 64.2 |
| 9 (Second Face of Cover Glass) (Image Surface) | 0.00 | | | |

| Face Number | k | A | B | C | D |
|---|---|---|---|---|---|
| 1 | −9.6E−1 | 3.6E−2 | −4.8E−2 | 1.0E−2 | −8.7E−2 |
| 2 | 1.5E+1 | −4.0E−2 | −1.4E−1 | 6.4E−2 | 1.1E−1 |
| 4 | −3.4E−1 | 9.7E−2 | 7.3E−1 | −1.7E−1 | −2.6E−2 |
| 5 | −6.8E−1 | 1.2E−1 | 2.9E−1 | −5.6E−2 | −2.8E−2 |
| 6 | −1.7E+3 | 4.7E−2 | −1.2E−2 | 7.6E−4 | 4.1E−5 |
| 7 | −8.0E+1 | −7.5E−2 | 2.3E−2 | −4.5E−3 | 1.6E−4 |

Under such conditions, L/fl = 1.19 was achieved, thereby satisfying the expression (1).
$f_1/fl$ = 0.750 was achieved, thereby satisfying the expression (2).
$f_1/f_2$ = 0.0164 was achieved, thereby satisfying the expression (3).
$f_1/f_3$ = −0.1207 was achieved, thereby satisfying the expression (4).
$r_5/r_6$ = −2.00 was achieved, thereby satisfying the expression (5).
$d_2/fl$ = 0.188 was achieved, thereby satisfying the expression (6).
$d_3/fl$ = 0.125 was achieved, thereby satisfying the expression (7).
$d_4/fl$ = 0.078 was achieved, thereby satisfying the expression (8).
$r_1/r_2$ = 0.130 was achieved, thereby satisfying the expression (9).

FIG. 13 shows the spherical aberration, astigmatism, and distortion of the imaging lens 1 of the SIXTH EXAMPLE.

According to the result, each of the spherical aberration, astigmatism, distortion, and lateral aberration was satisfied. It can be seen from the result that a sufficiently excellent optical property can be obtained.

Seventh Example

Figure 14:
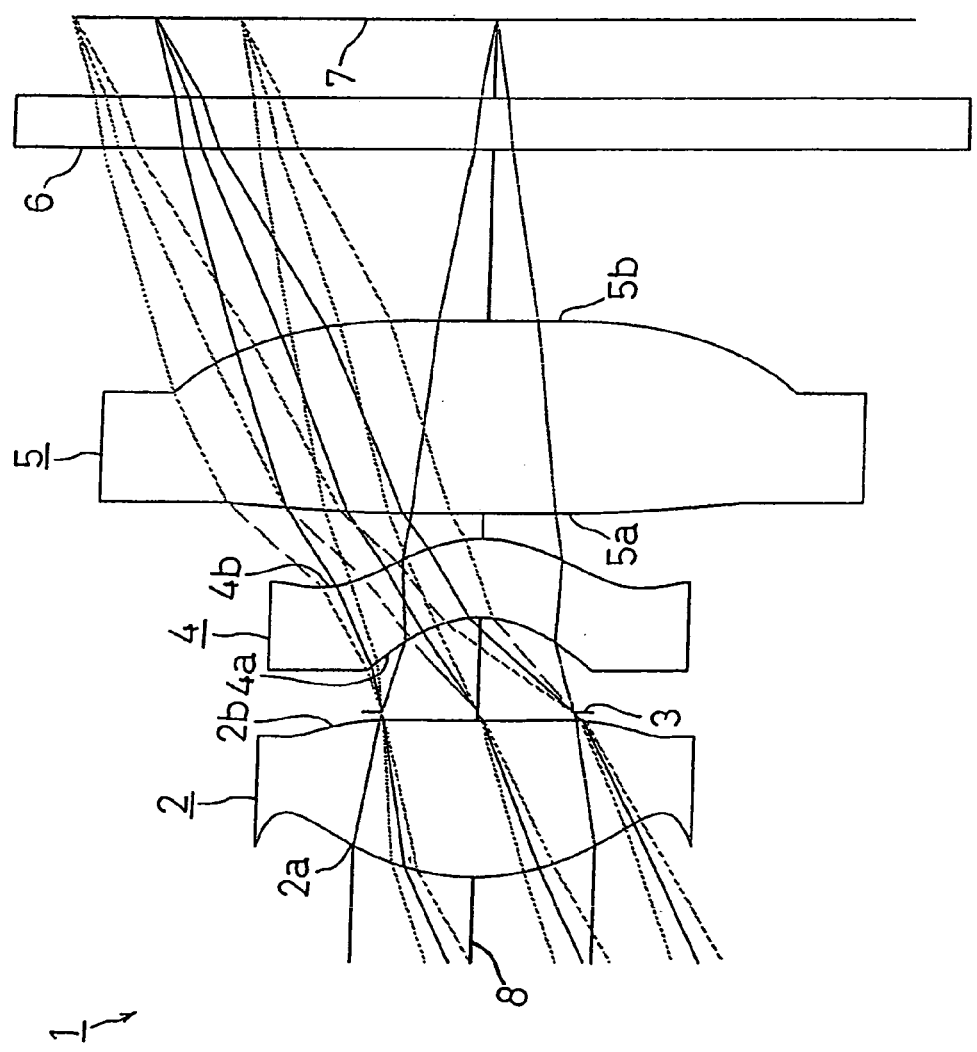
FIG. 14 is a schematic diagram for showing SEVENTH EXAMPLE of the imaging lens according to the present invention.

FIG. 14 shows SEVENTH EXAMPLE of the present invention. The imaging lens 1 of SEVENTH EXAMPLE shown in FIG. 14 was set under the following condition.

(Lens Data)
fl = 4.06 mm, F no = 2.8

| Face Number | r | d | nd | vd |
|---|---|---|---|---|
| (Object Point) | | | | |
| 1 (First Face of First Lens) | 1.47 | 0.92 | 1.5310 | 56.0 |
| 2 (Second Face of First Lens) | 12.75 | 0.05 | | |
| 3 (Diaphragm) | 0.00 | 0.56 | | |
| 4 (First Face of Second Lens) | −0.68 | 0.46 | 1.5850 | 30.0 |
| 5 (Second Face of Second Lens) | −0.85 | 0.15 | | |

-continued (Lens Data)
fl = 4.06 mm, F no = 2.8

| | r | d | nd | vd |
|---|---|---|---|---|
| 6 (First Face of Third Lens) | −40.80 | 1.12 | 1.5310 | 56.0 |
| 7 (Second Face of Third Lens) | 20.40 | 1.00 | | |
| 8 (First Face of Cover Glass) | 0.00 | 0.30 | 1.5168 | 64.2 |
| 9 (Second Face of Cover Glass) (Image Surface) | 0.00 | | | |

| Face Number | k | A | B | C | D |
|---|---|---|---|---|---|
| 1 | −9.6E−1 | 3.3E−2 | −1.9E−2 | 5.4E−2 | −6.5E−2 |
| 2 | 0 | −3.9E−2 | −1.9E−1 | 1.1E−1 | 8.1E−3 |
| 4 | −3.9E−1 | 1.2E−1 | 1.0 | −1.0 | 2.9E−1 |
| 5 | −7.8E−1 | 1.3E−1 | 4.4E−1 | −2.7E−1 | 4.1E−2 |
| 6 | 0 | 4.7E−2 | −2.2E−2 | −4.8E−3 | −4.0E−4 |
| 7 | 0 | −9.5E−2 | 3.3E−2 | −7.2E−2 | 5.0E−4 |

Under such conditions, L/fl = 1.20 was achieved, thereby satisfying the expression (1).
$f_1/fl$ = 0.744 was achieved, thereby satisfying the expression (2).
$f_1/f_2$ = 0.0019 was achieved, thereby satisfying the expression (3).
$f_1/f_3$ = −0.1192 was achieved, thereby satisfying the expression (4).
$r_5/r_6$ = −1.95 was achieved, thereby satisfying the expression (5).
$d_2/fl$ = 0.150 was achieved, thereby satisfying the expression (6).
$d_3/fl$ = 0.113 was achieved, thereby satisfying the expression (7).
$d_4/fl$ = 0.037 was achieved, thereby satisfying the expression (8).
$r_1/r_2$ = 0.115 was achieved, thereby satisfying the expression (9).

Figure 15:
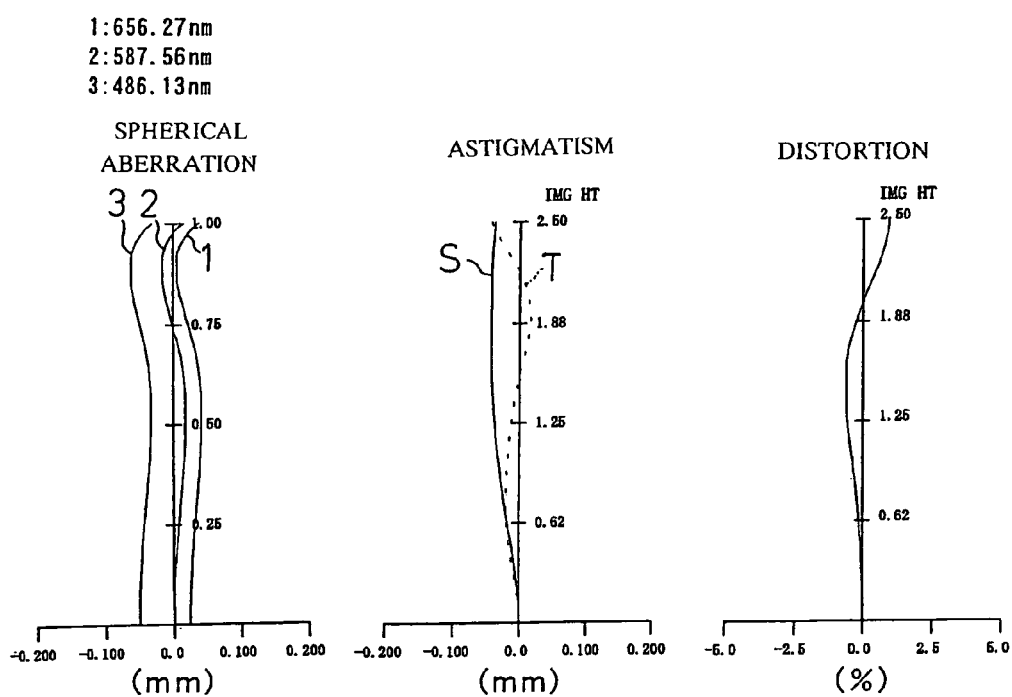
FIG. 15 shows graphs for describing the spherical aberration, astigmatism, and distortion of the imaging lens shown in FIG. 14.

FIG. 15 shows the spherical aberration, astigmatism, and distortion of the imaging lens 1 of the SEVENTH EXAMPLE.

According to the result, each of the spherical aberration, astigmatism, distortion, and lateral aberration was satisfied. It can be seen from the result that a sufficiently excellent optical property can be obtained.

Eighth Example

Figure 16:
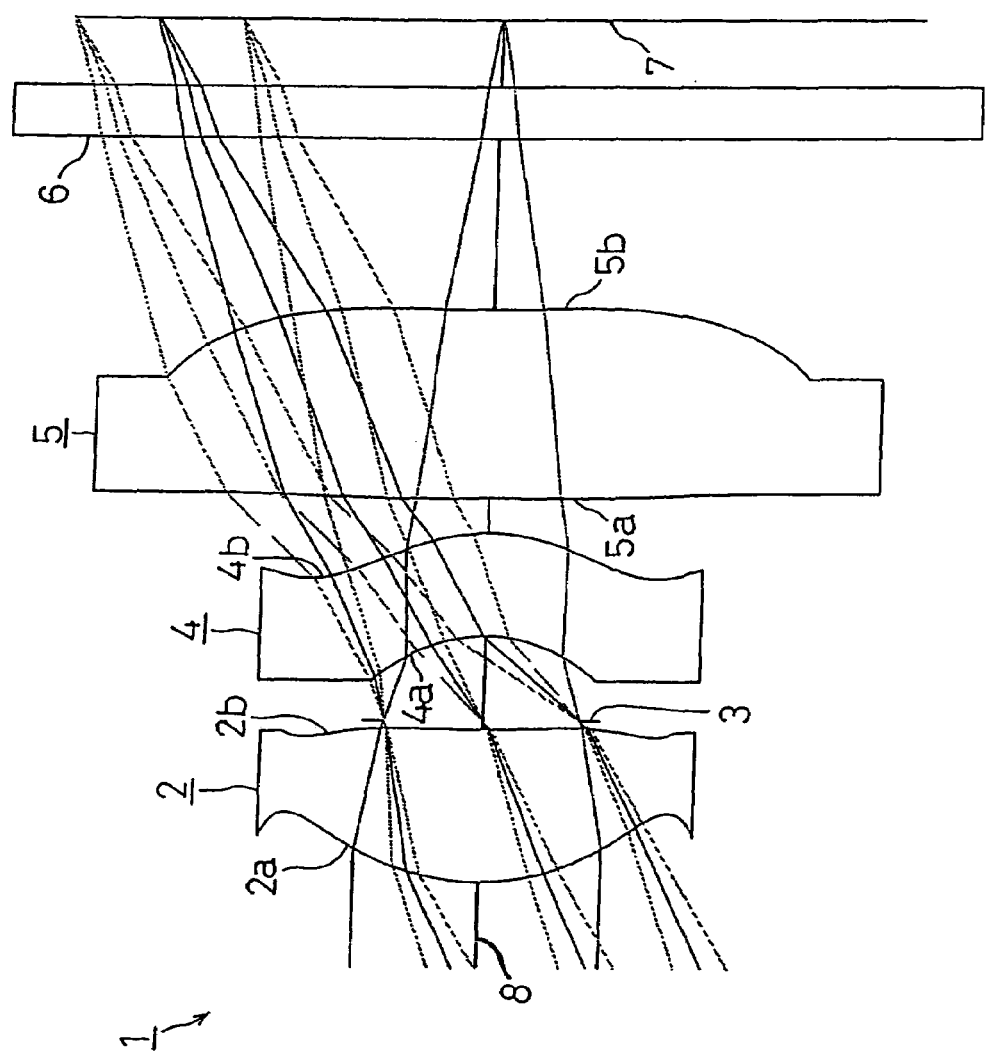
FIG. 16 is a schematic diagram for showing EIGHTH EXAMPLE of the imaging lens according to the present invention.

FIG. 16 shows EIGHTH EXAMPLE of the present invention. The imaging lens 1 of EIGHTH EXAMPLE shown in FIG. 16 was set under the following condition.

(Lens Data)
fl = 4.08 mm, F no = 2.8

| Face Number | r | d | nd | vd |
|---|---|---|---|---|
| (Object Point) | | | | |
| 1 (First Face of First Lens) | 1.44 | 0.90 | 1.5310 | 56.0 |
| 2 (Second Face of First Lens) | 11.11 | 0.05 | | |
| 3 (Diaphragm) | 0.00 | 0.56 | | |
| 4 (First Face of Second Lens) | −0.87 | 0.60 | 1.5850 | 30.0 |
| 5 (Second Face of Second Lens) | −1.08 | 0.20 | | |
| 6 (First Face of Third Lens) | −50.00 | 1.10 | 1.5310 | 56.0 |
| 7 (Second Face of Third Lens) | 11.77 | 1.00 | | |
| 8 (First Face of Cover Glass) | 0.00 | 0.30 | 1.5168 | 64.2 |
| 9 (Second Face of Cover Glass) (Image Surface) | 0.00 | | | |

| Face Number | k | A | B | C | D |
|---|---|---|---|---|---|
| 1 | −9.8E−1 | 3.5E−2 | −4.7E−3 | 2.9E−2 | −5.4E−2 |
| 2 | −4.7E+1 | −1.3E−2 | −2.3E−1 | 1.6E−1 | 0 |
| 4 | 1.9E−1 | 1.7E−1 | 2.0E−1 | 2.2E−1 | 0 |
| 5 | −4.4E−1 | 1.6E−1 | 1.3E−1 | −1.8E−2 | −5.0E−3 |

-continued (Lens Data)
fl = 4.08 mm, F no = 2.8

| | | | | | |
|---|---|---|---|---|---|
| 6 | 7.3E+2 | 2.9E−2 | −8.2E−3 | −1.1E−3 | 4.9E−4 |
| 7 | 7.2 | −7.2E−2 | 1.8E−2 | −3.1E−3 | 6.1E−5 |

Under such conditions, L/fl = 1.21 was achieved, thereby satisfying the expression (1).
$f_1/fl$ = 0.735 was achieved, thereby satisfying the expression (2).
$f_1/f_2$ = 0.0208 was achieved, thereby satisfying the expression (3).
$f_1/f_3$ = −0.1690 was achieved, thereby satisfying the expression (4).
$r_5/r_6$ = −4.25 was achieved, thereby satisfying the expression (5).
$d_2/fl$ = 0.135 was achieved, thereby satisfying the expression (6).
$d_3/fl$ = 0.147 was achieved, thereby satisfying the expression (7).
$d_4/fl$ = 0.049 was achieved, thereby satisfying the expression (8).
$r_1/r_2$ = 0.130 was achieved, thereby satisfying the expression (9).

Figure 17:
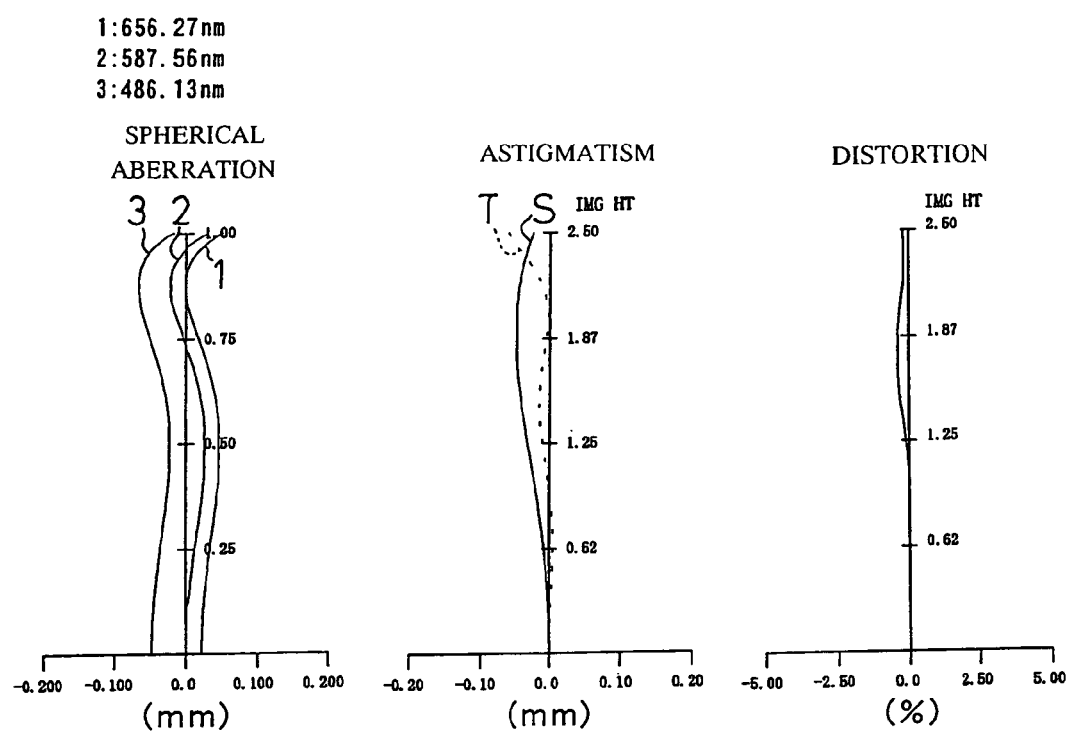
FIG. 17 shows graphs for describing the spherical aberration, astigmatism, and distortion of the imaging lens shown in FIG. 16.

FIG. 17 shows the spherical aberration, astigmatism, and distortion of the imaging lens 1 of the EIGHTH EXAMPLE.

According to the result, each of the spherical aberration, astigmatism, distortion, and lateral aberration was satisfied. It can be seen from the result that a sufficiently excellent optical property can be obtained.

Ninth Example

Figure 18:
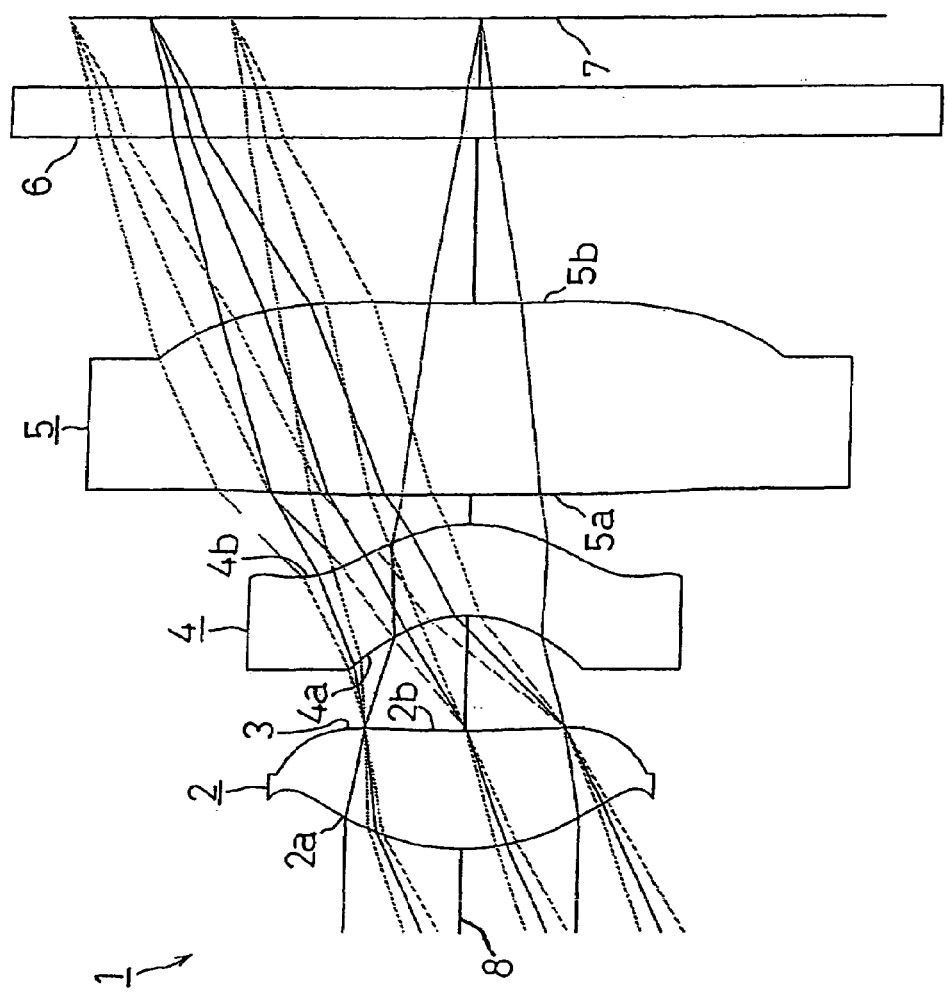
FIG. 18 is a schematic diagram for showing NINTH EXAMPLE of the imaging lens according to the present invention.

FIG. 18 shows NINTH EXAMPLE of the present invention. The imaging lens 1 of NINTH EXAMPLE shown in FIG. 18 was set under the following condition.

(Lens Data)
fl = 4.06 mm, F no = 2.8

| Face Number | r | d | nd | vd |
|---|---|---|---|---|
| (Object Point) | | | | |
| 1 (First Face of First Lens) | 1.43 | 0.72 | 1.5310 | 56.0 |
| 2 (Second Face of First Lens) | 7.69 | 0.02 | | |
| 3 (Diaphragm) | 0.00 | 0.68 | | |
| 4 (First Face of Second Lens) | −0.84 | 0.55 | 1.5850 | 30.0 |
| 5 (Second Face of Second Lens) | −1.00 | 0.18 | | |
| 6 (First Face of Third Lens) | −60.61 | 1.15 | 1.5310 | 56.0 |
| 7 (Second Face of Third Lens) | 10.99 | 1.00 | | |
| 8 (First Face of Cover Glass) | 0.00 | 0.30 | 1.5168 | 64.2 |
| 9 (Second Face of Cover Glass) (Image Surface) | 0.00 | | | |

| Face Number | k | A | B | C | D |
|---|---|---|---|---|---|
| 1 | −8.4E−1 | 3.7E−2 | −2.5E−2 | 7.0E−2 | −9.0E−2 |
| 2 | 0 | −3.3E−2 | −6.7E−2 | −5.7E−2 | 0 |
| 4 | −4.8E−2 | 4.8E−2 | 4.4E−1 | −6.9E−2 | 0 |
| 5 | −5.5E−1 | 1.1E−1 | 1.0E−1 | 8.0E−2 | −5.1E−2 |
| 6 | 0 | 2.2E−2 | −8.6E−3 | 1.3E−3 | −3.3E−5 |
| 7 | −5.6E−2 | −6.5E−2 | 1.6E−2 | −3.3E−2 | 2.0E−4 |

Under such conditions, L/fl = 1.21 was achieved, thereby satisfying the expression (1).
$f_1/fl$ = 0.660 was achieved, thereby satisfying the expression (2).
$f_1/f_2$ = 0.0834 was achieved, thereby satisfying the expression (3).
$f_1/f_3$ = −0.1545 was achieved, thereby satisfying the expression (4).
$r_5/r_6$ = −5.52 was achieved, thereby satisfying the expression (5).
$d_2/fl$ = 0.172 was achieved, thereby satisfying the expression (6).
$d_3/fl$ = 0.135 was achieved, thereby satisfying the expression (7).
$d_4/fl$ = 0.044 was achieved, thereby satisfying the expression (8).
$r_1/r_2$ = 0.186 was achieved, thereby satisfying the expression (9).

Figure 19:
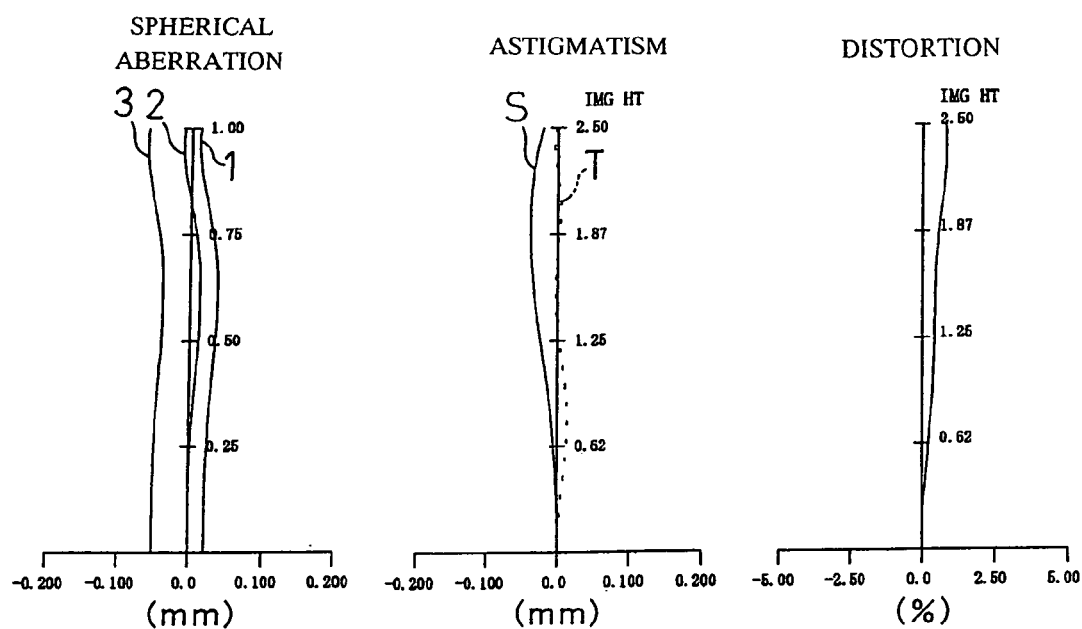
FIG. 19 shows graphs for describing the spherical aberration, astigmatism, and distortion of the imaging lens shown in FIG. 18.

FIG. 19 shows the spherical aberration, astigmatism, and distortion of the imaging lens 1 of the NINTH EXAMPLE.

According to the result, each of the spherical aberration, astigmatism, distortion, and lateral aberration was satisfied. It can be seen from the result that a sufficiently excellent optical property can be obtained.

Tenth Example

Figure 20:
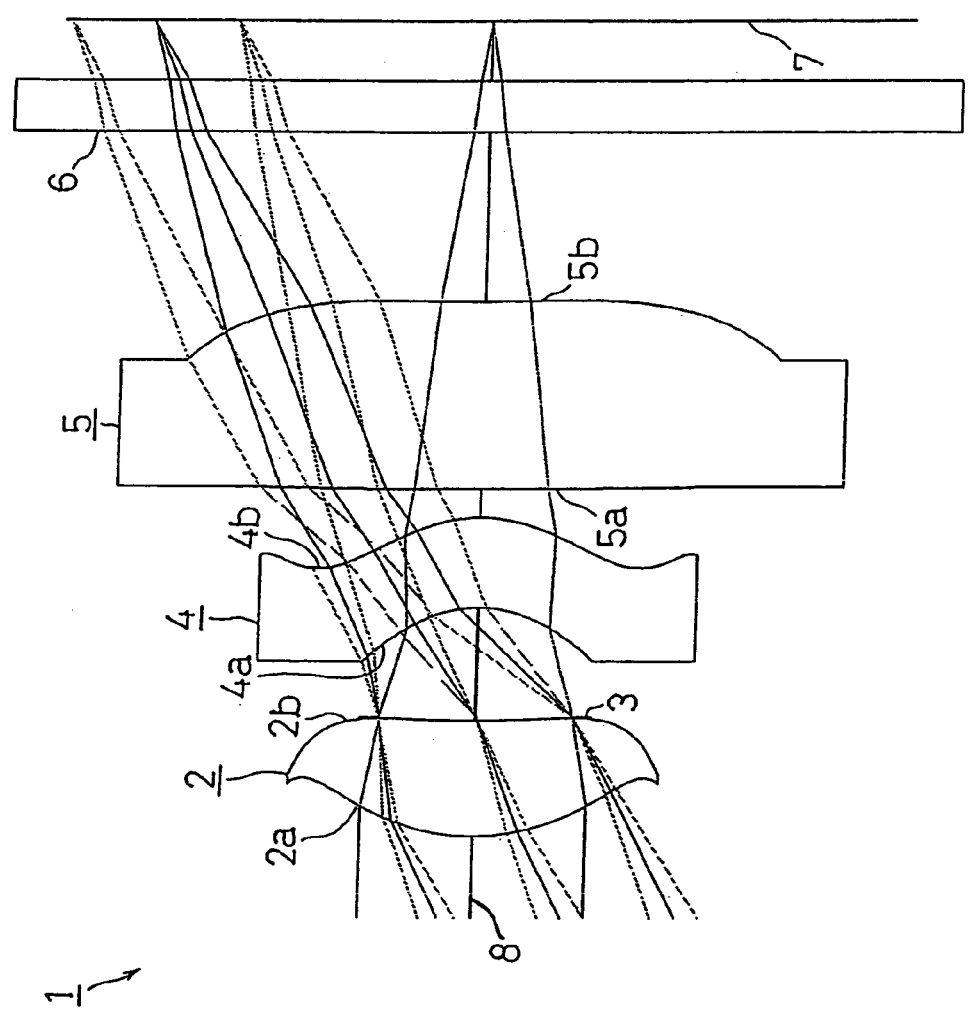
FIG. 20 is a schematic diagram for showing TENTH EXAMPLE of the imaging lens according to the present invention.

FIG. 20 shows TENTH EXAMPLE of the present invention. The imaging lens 1 of TENTH EXAMPLE shown in FIG. 20 was set under the following condition.

(Lens Data)
fl = 3.88 mm, F no = 2.8

| Face Number | r | d | nd | vd |
|---|---|---|---|---|
| (Object Point) | | | | |
| 1 (First Face of First Lens) | 1.37 | 0.69 | 1.5310 | 56.0 |
| 2 (Second Face of First Lens) | 7.41 | 0.02 | | |
| 3 (Diaphragm) | 0.00 | 0.65 | | |
| 4 (First Face of Second Lens) | −0.81 | 0.53 | 1.5850 | 30.0 |
| 5 (Second Face of Second Lens) | −0.96 | 0.17 | | |
| 6 (First Face of Third Lens) | −66.67 | 1.10 | 1.5310 | 56.0 |
| 7 (Second Face of Third Lens) | 11.11 | 1.00 | | |
| 8 (First Face of Cover Glass) | 0.00 | 0.30 | 1.5168 | 64.2 |
| 9 (Second Face of Cover Glass) (Image Surface) | 0.00 | | | |

| Face Number | k | A | B | C | D |
|---|---|---|---|---|---|
| 1 | −8.4E−1 | 4.2E−2 | −3.0E−2 | 9.2E−2 | −1.3E−1 |
| 2 | 0 | −4.3E−2 | −5.9E−2 | −1.0E−1 | 0 |
| 4 | −8.5E−2 | 4.8E−2 | 5.5E−1 | −1.1E−1 | 0 |
| 5 | −5.7E−1 | 1.3E−1 | 1.2E−1 | 1.1E−1 | −6.6E−2 |
| 6 | 0 | 2.5E−2 | −1.5E−2 | 1.6E−3 | 4.7E−4 |
| 7 | −1.0E+2 | −6.8E−2 | 1.9E−2 | −5.2E−3 | 3.8E−4 |

Under such conditions, L/fl = 1.21 was achieved, thereby satisfying the expression (1).
$f_1/fl$ = 0.781 was achieved, thereby satisfying the expression (2).
$f_1/f_2$ = 0.0956 was achieved, thereby satisfying the expression (3).
$f_1/f_3$ = −0.1705 was achieved, thereby satisfying the expression (4).
$r_5/r_6$ = −6.00 was achieved, thereby satisfying the expression (5).
$d_2/fl$ = 0.173 was achieved, thereby satisfying the expression (6).
$d_3/fl$ = 0.137 was achieved, thereby satisfying the expression (7).
$d_4/fl$ = 0.044 was achieved, thereby satisfying the expression (8).
$r_1/r_2$ = 0.185 was achieved, thereby satisfying the expression (9).

Figure 21:
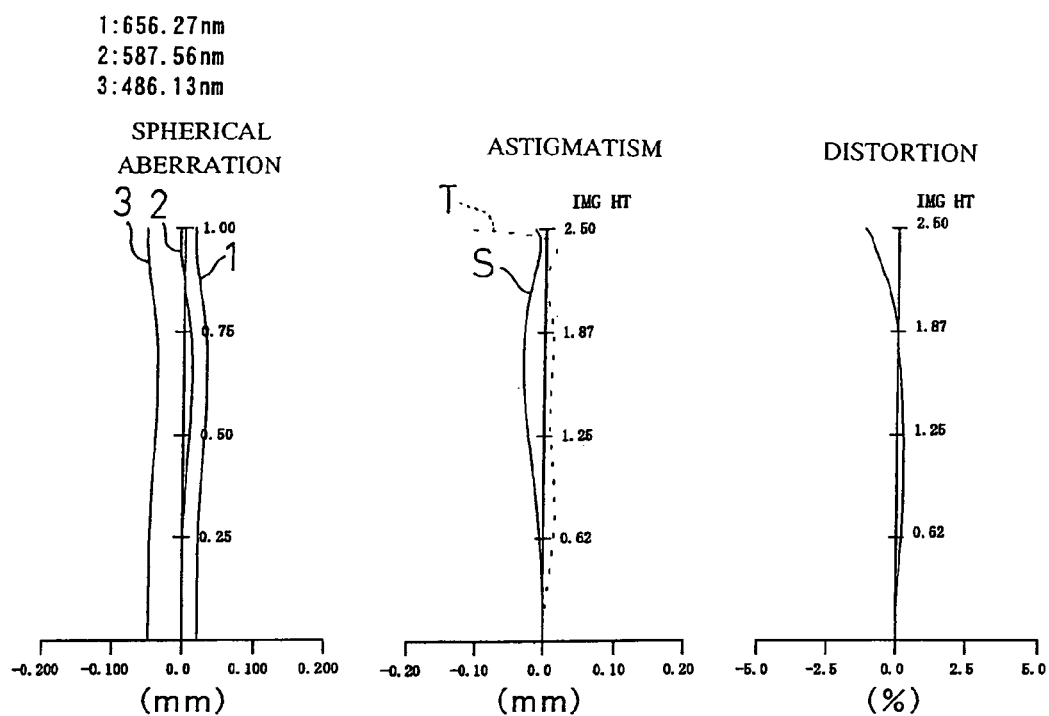
FIG. 21 shows graphs for describing the spherical aberration, astigmatism, and distortion of the imaging lens shown in FIG. 20.

FIG. 21 shows the spherical aberration, astigmatism, and distortion of the imaging lens 1 of the TENTH EXAMPLE.

According to the result, each of the spherical aberration, astigmatism, distortion, and lateral aberration was satisfied. It can be seen from the result that a sufficiently excellent optical property can be obtained.

The present invention is not limited to the above-described embodiments and EXAMPLES, and various modifications are possible as required.

What is claimed is:

1. An imaging lens used for forming an image of an object on an image taking surface of a solid-state image sensor element, comprising:
in order from an object side towards an image surface side, a first lens which is a meniscus lens having a positive power whose convex surface faces the object side, a diaphragm, a second lens which is a meniscus lens having a positive power whose convex surface faces the image surface side, and a third lens which is a biconcave lens having a negative power, wherein
conditions expressed by each of following expressions (1)–(4) are to be satisfied;

$$1.3 \geq L/fl \geq 1 \quad (1)$$

$$0.8 \geq f_1/fl \geq 0.6 \quad (2)$$

$$0.12 \geq f_1/f_2 \geq 0 \qquad (3)$$

$$-0.1 \geq f_1/f_3 \geq -0.25 \qquad (4)$$

where,
- L: entire length of the lens system (distance from the surface of the object side of the first lens to the image taking surface [air reduced length])
- fl: focal distance of the entire lens system
- $f_1$: focal distance of the first lens
- $f_2$: focal distance of the second lens
- $f_3$: focal distance of the third lens.

2. The imaging lens according to claim 1, wherein, further, a condition expressed by a following expression (5) is to be satisfied;

$$-1.5 \geq r_5/r_6 \geq 10 \qquad (5)$$

where,
- $r_5$: center radius curvature of the object side face of the third lens
- $r_6$: center radius curvature of the image surface side face of the third lens.

3. The imaging lens according to claim 1, wherein, further, a condition expressed by a following expression (6) is to be satisfied;

$$0.2 \geq d_2/fl \geq 0.12 \qquad (6)$$

where,
- $d_2$: distance between the first lens and the second lens on the optical axis.

4. The imaging lens according to claim 1, wherein, further, a condition expressed by a following expression (7) is to be satisfied;

$$0.2 \geq d_3/fl \geq 0.01 \qquad (7)$$

where,
- $d_3$: center thickness of the second lens.

5. The imaging lens according to claim 1, wherein, further, a condition expressed by a following expression (8) is to be satisfied;

$$0.11 \geq d_4/fl \geq 0.03 \qquad (8)$$

where,
- $d_4$: distance between the second lens and the third lens on the optical axis.

6. The imaging lens according to claim 1, wherein, further, a condition expressed by a following expression (9) is to be satisfied;

$$0.25 \geq r_1/r_2 \geq 0.05 \qquad (9)$$

where,
- $r_1$: center radius curvature of the object side face of the first lens
- $r_2$: center radius curvature of the image surface side face of the first lens.

* * * * *